(12) United States Patent
Ono et al.

(10) Patent No.: US 11,764,675 B2
(45) Date of Patent: Sep. 19, 2023

(54) POWER SUPPLY UNIT FOR AEROSOL INHALER

(71) Applicant: Japan Tobacco Inc., Tokyo (JP)

(72) Inventors: Yasuhiro Ono, Tokyo (JP); Minoru Kitahara, Tokyo (JP); Shujiro Tanaka, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 0 days.

(21) Appl. No.: 17/885,539

(22) Filed: Aug. 11, 2022

(65) Prior Publication Data

US 2022/0385183 A1 Dec. 1, 2022

Related U.S. Application Data

(63) Continuation of application No. 17/371,107, filed on Jul. 9, 2021, now Pat. No. 11,451,144.

(30) Foreign Application Priority Data

Jul. 9, 2020 (JP) ................................ 2020-118747

(51) Int. Cl.
| | | |
|---|---|---|
| *H02M 3/156* | (2006.01) | |
| *A24F 40/40* | (2020.01) | |
| *A24F 40/50* | (2020.01) | |

(52) U.S. Cl.
CPC ............. *H02M 3/156* (2013.01); *A24F 40/40* (2020.01); *A24F 40/50* (2020.01)

(58) Field of Classification Search
None
See application file for complete search history.

(56) References Cited

U.S. PATENT DOCUMENTS 5,939,835 A * 8/1999 Takeda ................... H05B 41/02
                                                       315/308
9,096,169 B2 * 8/2015 Ohmura ................ H02M 3/156
(Continued)

FOREIGN PATENT DOCUMENTS

| JP | 2011-36102 A | 2/2011 |
|---|---|---|
| JP | 2013-81330 A | 5/2013 |

(Continued)

OTHER PUBLICATIONS

Notice of Reasons for Refusal dated Oct. 20, 2020, received for JP Application 2020-118747, 7 pages.

(Continued)

*Primary Examiner* — Jeffrey A Gblende
(74) *Attorney, Agent, or Firm* — XSENSUS LLP

(57) ABSTRACT

A power supply unit for an aerosol inhaler includes: a power supply; a first DC/DC converter; a second DC/DC converter; and a circuit board. As viewed from a first direction perpendicular to a surface of the circuit board on which the first DC/DC converter and the second DC/DC converter are mounted, at least a portion of the circuit board includes: a connection portion; a first portion extending from the connection portion in a second direction perpendicular to the first direction; and a second portion extending from the connection portion in a third direction perpendicular to the first direction and the second direction. The first DC/DC converter is mounted on the first portion, and the second DC/DC converter is mounted on the second portion.

13 Claims, 10 Drawing Sheets

(56) References Cited

U.S. PATENT DOCUMENTS

| | | |
|---|---|---|
| 9,215,764 B1 | 12/2015 | Zhou et al. |
| 9,236,790 B2 | 1/2016 | Inakagata |
| 10,069,320 B2 | 9/2018 | Cai et al. |
| 11,451,144 B2 * | 9/2022 | Ono ................ A24F 40/30 |
| 2014/0083443 A1 | 3/2014 | Liu |
| 2014/0299137 A1 | 10/2014 | Kieckbusch et al. |
| 2016/0066619 A1 | 3/2016 | Di Carlo |
| 2017/0019033 A1 | 1/2017 | Ohno et al. |
| 2018/0035714 A1 | 2/2018 | Sur et al. |
| 2019/0067970 A1 | 2/2019 | Alarcon |
| 2020/0046033 A1 * | 2/2020 | Robert ................ H05B 3/42 |

FOREIGN PATENT DOCUMENTS

| | | |
|---|---|---|
| JP | 2019-527558 A | 10/2019 |
| JP | 2020-518236 A | 6/2020 |
| WO | 2015/182101 A1 | 12/2015 |

OTHER PUBLICATIONS

Decision to Grant dated Jan. 5, 2021, received for JP Application 2020-118747, 5 pages.
European Search Report dated Dec. 1, 2021, in corresponding European Patent Application No. 21184481.6.

* cited by examiner

FIG. 6

| | FIRST DC/DC CONVERTER | SECOND DC/DC CONVERTER |
|---|---|---|
| POWER CONSUMPTION DESTINATION | LOAD | OLED PANEL |
| OUTPUT VOLTAGE | 4.0 - 4.5 [V] | 10 - 15 [V] |
| OUTPUT CURRENT | 1 [A] OR MORE | 0.01 [A] OR LESS |
| SWITCHING FREQUENCY | 1.00 [MHz] | HIGHER THAN 1.00 [MHz] |
| CONVERSION EFFICIENCY | 90 [%] OR MORE | LESS THAN 90 [%] |
| MOUNTING SURFACE | FIRST SURFACE | FIRST SURFACE |
| ACTIVATION CONDITION | DETECTION OF PUFF OPERATION | DETECTION OF OPERATION OF OPERATION UNIT |
| END CONDITION | DETECTION OF END OF PUFF OPERATION OR CONTINUOUS ENERGIZATION UPPER LIMIT TIME HAS ELAPSED SINCE ACTIVATION | PREDETERMINED TIME HAS ELAPSED SINCE ACTIVATION OR DETECTION OF OPERATION OF OPERATION UNIT AGAIN WITHIN PREDETERMINED TIME SINCE ACTIVATION |

POWER SUPPLY UNIT FOR AEROSOL INHALER

CROSS-REFERENCE TO RELATED APPLICATIONS

This application is a continuation of U.S. application Ser. No. 17/371,107, filed Jul. 9, 2021, which claims priority to Japanese Patent Application No. 2020-118747 filed on Jul. 9, 2020, the content of which is incorporated herein by reference.

TECHNICAL FIELD

The present invention relates to a power supply unit for an aerosol inhaler.

BACKGROUND ART

In related art, there has been known a power supply unit for an aerosol inhaler which includes a power supply capable of supplying power to a heater for atomizing an aerosol source. For example, JP 2019-527558 T and US 2014/0299137 A disclose aerosol inhalers in which power supplied from a power supply is boosted by a converter and applied to a heater.

There is only one converter that boosts the power supplied from the power supply as disclosed in a power supply unit for an aerosol inhaler described in each of JP 2019-527558 T and US 2014/0299137 A. However, when there are a plurality of loads that function by consuming the power supplied from the power supply in the aerosol inhaler, voltages and currents required by the plurality of loads are different from each other. Therefore, it is preferable that the power supply unit for the aerosol inhaler is provided with a plurality of converters that boost the power supplied from the power supply in accordance with the voltages required by the loads. Meanwhile, when the plurality of converters are mounted on the power supply unit for the aerosol inhaler, since the converters generate heat or switching noise during functioning, heat generation or switching noise of one converter may influence the other converters.

It is an object of the present invention is to provides a power supply unit for an aerosol inhaler in which two DC/DC converters are mounted while an influence of heat and switching noise generated from one DC/DC converter on the other DC/DC converter can be reduced.

SUMMARY OF INVENTION

According to an aspect of the present invention, there is provided a power supply unit for an aerosol inhaler that includes: a power supply configured to supply power to a load that atomizes an aerosol source; a first DC/DC converter connected to the power supply; a second DC/DC converter connected to the power supply and different from the first DC/DC converter; and a circuit board on which the first DC/DC converter and the second DC/DC converter are mounted. As viewed from a first direction perpendicular to a surface of the circuit board on which the first DC/DC converter and the second DC/DC converter are mounted, at least a portion of the circuit board includes: a connection portion; a first portion extending from the connection portion in a second direction perpendicular to the first direction; and a second portion extending from the connection portion in a third direction perpendicular to the first direction and the second direction. The first DC/DC converter is mounted on the first portion, and the second DC/DC converter is mounted on the second portion.

BRIEF DESCRIPTION OF DRAWINGS

FIG. 6 is a table comparing specifications of a first DC/DC converter and a second DC/DC converter of the aerosol inhaler shown in FIG. 1.

DESCRIPTION OF EMBODIMENTS

Hereinafter, an embodiment of an aerosol inhaler including a power supply unit for an aerosol inhaler of the present invention will be described with reference to the accompanying drawings.

(Aerosol Inhaler)

An aerosol inhaler 1 is an instrument for inhaling a perfumed aerosol without burning, which preferably has a size that fits in a hand, and has a substantially rectangular parallelepiped shape. The aerosol inhaler 1 may also have an oval shape, an elliptical shape, or the like. In the following description, three directions orthogonal to the aerosol inhaler having the substantially rectangular parallelepiped shape will be respectively referred to as an up-down direction, a front-rear direction, and a left-right direction in descending order of lengths thereof. In the following description, a front side, a rear side, a left side, a right side, an upper side, and a lower side are defined as shown in FIGS. 1 to 3, and the front side is represented by Fr, the rear side is represented by Rr, the left side is represented by L, the right side is represented by R, the upper side is represented by U, and the lower side is represented by D for the sake of convenience.

Figure 1:
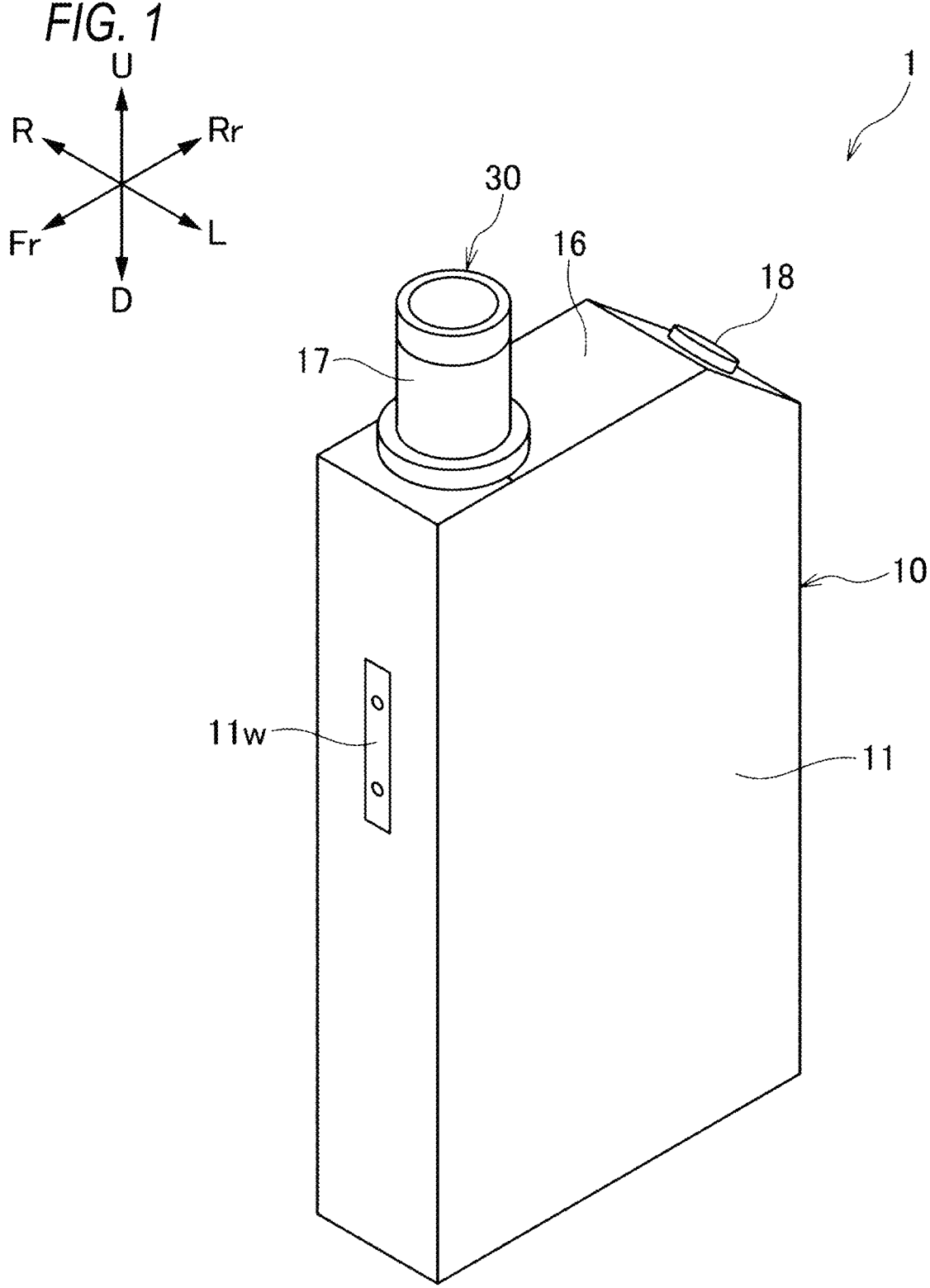
FIG. 1 is a perspective view of an aerosol inhaler of an embodiment of the present invention.
Figure 2:
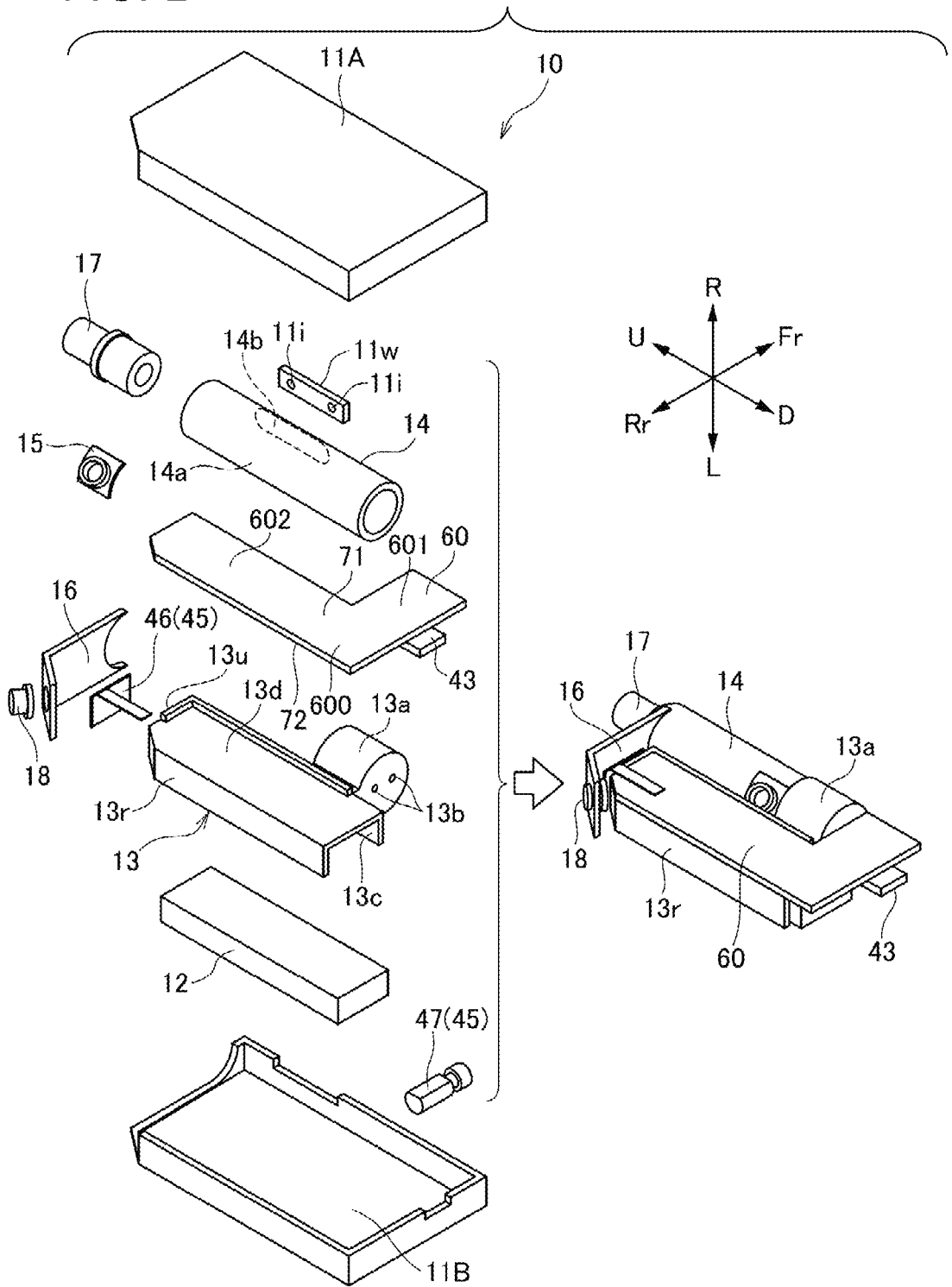
FIG. 2 is an exploded perspective view of the aerosol inhaler shown in FIG. 1.
Figure 3:
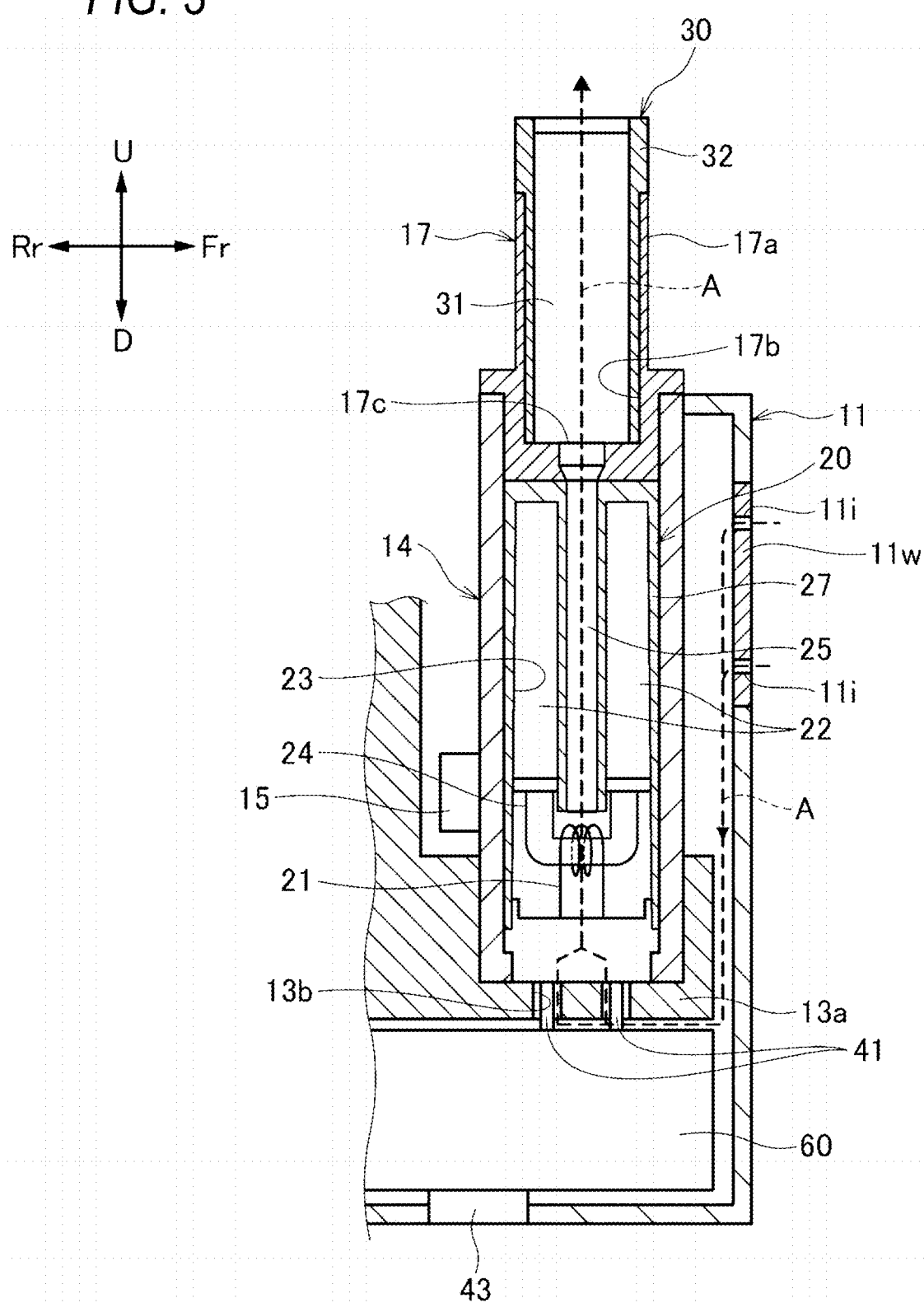
FIG. 3 is a cross-sectional view of the aerosol inhaler shown in FIG. 1.

As shown in FIGS. 1 to 3, the aerosol inhaler 1 includes a power supply unit 10, a first cartridge 20, and a second cartridge 30. The first cartridge 20 and the second cartridge 30 are attachable to and detachable from the power supply unit 10. In other words, the first cartridge 20 and the second cartridge 30 are replaceable.

(Power Supply Unit)

As shown in FIGS. 1 and 2, the power supply unit 10 accommodates, in a substantially rectangular parallelepiped power supply unit case 11 (hereinafter, also referred to as inside the case), a power supply 12, an internal holder 13, a circuit board 60, and various sensors such as an intake sensor 15.

The power supply unit case 11 includes a first case 11A and a second case 11B that are attachable and detachable in the left-right direction (thickness direction). The first case 11A and the second case 11B are assembled in the left-right direction (thickness direction) so as to form a front surface, a rear surface, a left surface, a right surface, and a lower surface of the power supply unit 10. An upper surface of the power supply unit 10 is formed by a display device 16.

A mouthpiece 17 is provided on the upper surface of the power supply unit 10 in front of the display device 16. An inhale port 17a of the mouthpiece 17 protrudes further upward as compared with the display device 16.

An inclined surface that is inclined downward toward the rear side is provided between the upper surface and the rear surface of the power supply unit 10. An operation unit 18 that can be operated by a user is provided on the inclined surface. The operation unit 18 includes a button-type switch, a touch panel, and the like, and is used, for example, when a micro controller unit (MCU) 50 and various sensors are activated/shut off to reflect a use intention of the user.

A charge terminal 43 capable of being electrically connected to an external power supply (not shown) that can charge the power supply 12 is provided on the lower surface of the power supply unit 10. The charge terminal 43 is, for example, a receptacle to which a mating side plug (not shown) can be fitted. A receptacle or the like to which various USB terminals (plugs) can be connected can be adopted as the charge terminal 43. In the present embodiment, as an example, the charge terminal 43 is a USB Type-C receptacle.

The charge terminal 43 may include, for example, a power receiving coil, and may be configured to receive power transmitted from the external power supply in a non-contact manner. A method of wireless power transfer in this case may be an electromagnetic induction type method, a magnetic resonance type method, or a combination of the electromagnetic induction type method and the magnetic resonance type method. As another example, the charge terminal 43 can be connected to various USB terminals, and may include the power receiving coil described above.

The internal holder 13 includes a rear wall 13r extending along the rear surface of the power supply unit 10, a central wall 13c which is provided at a front-rear direction central portion inside the case and extends parallel to the rear wall 13r, an upper wall 13u which extends along the display device 16 and connects the rear wall 13r and the central wall 13c, a partition wall 13d which is orthogonal to the rear wall 13r, the central wall 13c, and the upper wall 13u and divides a space defined by the rear wall 13r, the central wall 13c, and the upper wall 13u into a left space and a right space, and a cartridge holding portion 13a which is connected to the central wall 13c and located in front of the central wall 13c above the lower surface of the power supply unit 10.

The power supply 12 is arranged in the left space of the internal holder 13. The power supply 12 is a rechargeable secondary battery, an electric double layer capacitor or the like, and is preferably a lithium ion secondary battery. An electrolyte of the power supply 12 may be constituted by one of a gel electrolyte, an electrolytic solution, a solid electrolyte, an ionic liquid, or a combination thereof. In the present embodiment, an output voltage of the power supply 12 when the power supply 12 is in a fully charged state (hereinafter, also referred to as a fully charged voltage) is 4.2 [V]. The output voltage of the power supply 12 decreases as a remaining capacity of the power supply 12 decreases. Then the power supply 12 stops discharging when the output voltage reaches a predetermined end-of-discharge voltage. Here, the end-of-discharge voltage is a voltage lower than 4.2 [V], which is the fully charged voltage, and may be, for example, about 3 [V]. A state where the discharging is stopped since the output voltage reaches the end-of-discharge voltage is hereinafter also referred to as an end-of-discharge state.

The L-shaped circuit board 60 is arranged in a space formed by the right space of the internal holder 13 and a lower space formed between the cartridge holding portion 13a and the lower surface of the power supply unit 10. The circuit board 60 is formed by stacking a plurality of layers (four layers in the present embodiment) of boards, and is mounted with electronic components (elements) such as a charging IC 55 and the MCU 50.

The charging IC 55 is an integrated circuit (IC) that controls charging of the power supply 12 with power input from the charge terminal 43 and supplies the power of the power supply 12 to the electronic components of the circuit board 60 and the like.

Figure 5:
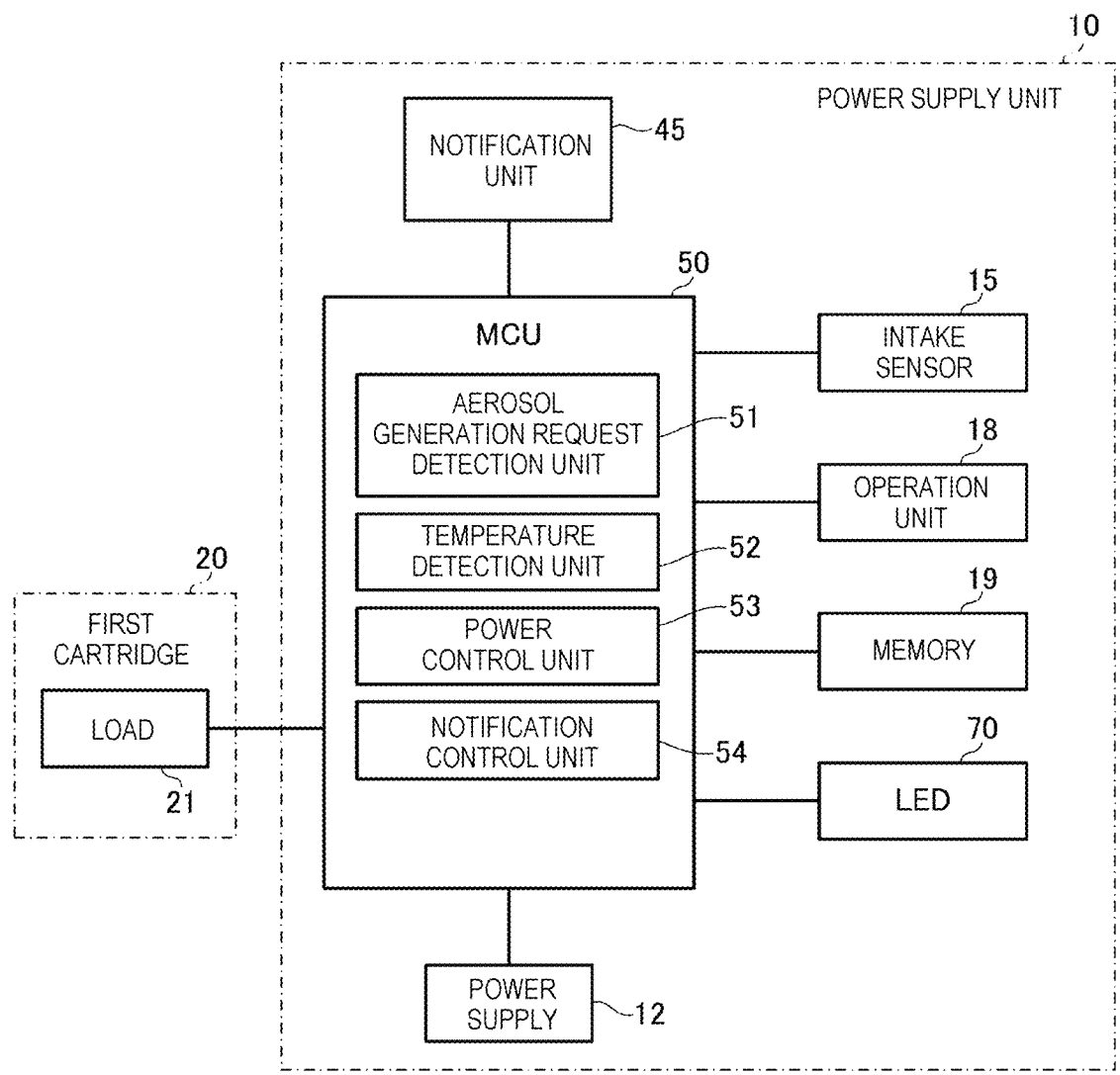
FIG. 5 is a block diagram showing a configuration of an MCU of the power supply unit of the aerosol inhaler shown in FIG. 1.

As shown in FIG. 5, the MCU 50 is connected to various sensor devices (such as the intake sensor 15 that detects a puff (intake) operation), the operation unit 18, a notification unit 45, and a memory 19 that stores the number of times of puff operations, a time of energization to a load 21 or the like, and thus performs various types of control of the aerosol inhaler 1. Specifically, the MCU 50 mainly includes a processor, and further includes storage media, such as a random access memory (RAM) necessary for operations of the processor and a read only memory (ROM) that stores various types of information. More specifically, the processor in the present specification is an electric circuit in which circuit elements such as semiconductor elements are combined. A part of elements (for example, the intake sensor 15 and the memory 19) connected to the MCU 50 in FIG. 5 may also be provided inside the MCU 50 as a function of the MCU 50 itself.

A cylindrical cartridge holder 14 that holds the first cartridge 20 is arranged in the cartridge holding portion 13a.

A through hole 13b that receives a discharge terminal 41 (see FIG. 3), which protrudes from the circuit board 60 toward the first cartridge 20, is provided in a lower end portion of the cartridge holding portion 13a. The discharge terminal 41 is, for example, a pin which is incorporated with a spring, and is configured to be electrically connectable to the load 21 of the first cartridge 20. The through hole 13b is larger than the discharge terminal 41, and is configured such that air flows into the first cartridge 20 through a gap formed between the through hole 13b and the discharge terminal 41.

The intake sensor 15 which detects the puff operation is provided on an outer peripheral surface 14a of the cartridge holder 14 at a position facing the circuit board 60. The intake sensor 15 may be constituted by a condenser microphone, a pressure sensor, or the like. The cartridge holder 14 is provided with a hole portion 14b elongated in the up-down direction through which a remaining amount of an aerosol source 22 stored inside the first cartridge 20 can be visually checked, and is configured such that the user can visually check the remaining amount of the aerosol source 22 stored inside the first cartridge 20 through the hole portion 14b of the first cartridge 20 from a translucent remaining amount check window 11w provided in the power supply unit case 11.

As shown in FIG. 3, the mouthpiece 17 is detachably fixed to an upper end portion of the cartridge holder 14. The second cartridge 30 is detachably fixed to the mouthpiece 17. The mouthpiece 17 includes a cartridge accommodating portion 17b that accommodates a part of the second cartridge 30, and a communication path 17c that allows the first cartridge 20 and the cartridge accommodating portion 17b to communicate with each other.

The power supply unit case 11 is provided with an air inlet 11i through which outside air is taken in. The air inlet 11i is provided in, for example, the remaining amount check window 11w.

(First Cartridge)

As shown in FIG. 3, inside a cylindrical cartridge case 27, the first cartridge 20 includes a reservoir 23 that stores the aerosol source 22, the electric load 21 that atomizes the aerosol source 22, a wick 24 that draws the aerosol source from the reservoir 23 to the load 21, and an aerosol flow path 25 through which aerosol generated by the atomization of the aerosol source 22 flows toward the second cartridge 30.

The reservoir 23 is partitioned to surround a periphery of the aerosol flow path 25. The reservoir 23 stores the aerosol source 22. A porous body, such as a resin web or cotton, may be accommodated in the reservoir 23, and the aerosol source 22 may be impregnated in the porous body. The reservoir 23 may only store the aerosol source 22 without accommodating the porous body such as the resin web or cotton. The aerosol source 22 includes a liquid such as glycerin, propylene glycol or water.

The wick 24 is a liquid holding member that draws the aerosol source 22 from the reservoir 23 to the load 21 by utilizing a capillary phenomenon. The wick 24 is made of, for example, glass fibers or porous ceramic.

The load 21 atomizes the aerosol source 22 by heating the aerosol source 22 by power supplied from the power supply 12 via the discharge terminal 41 without burning. The load 21 is formed of an electric heating wire (coil) wound at a predetermined pitch. The load 21 may also be any element that can atomize the aerosol source 22 to generate the aerosol. The load 21 is, for example, a heat generating element. Examples of the heat generating element include a heat generating resistor, a ceramic heater, and an induction heating type heater.

The aerosol flow path 25 is provided on a center line of the first cartridge 20 on a downstream side of the load 21.

(Second Cartridge)

The second cartridge 30 stores a perfume source 31. The second cartridge 30 is detachably accommodated in the cartridge accommodating portion 17b provided in the mouthpiece 17.

The aerosol generated by atomizing the aerosol source 22 by the load 21 is passed through the perfume source 31 in the second cartridge 30, so that the aerosol is imparted with a perfume. Chopped tobacco or a molded body obtained by molding a tobacco raw material into particles can be used as a raw material piece that forms the perfume source 31. The perfume source 31 may also be formed of a plant other than tobacco (for example, mint, Chinese herb, or herb). The perfume source 31 may also be provided with a fragrance such as menthol.

According to the aerosol inhaler 1 of the present embodiment, the perfumed aerosol can be generated by the aerosol source 22, the perfume source 31, and the load 21. That is, the aerosol source 22 and the perfume source 31 constitute an aerosol generation source that generates the aerosol to which the perfume is imparted.

In addition to a configuration in which the aerosol source 22 and the perfume source 31 are separated from each other, a configuration in which the aerosol source 22 and the perfume source 31 are integrally formed, a configuration in which the perfume source 31 is omitted and substances that can be included in the perfume source 31 are added to the aerosol source 22, or a configuration in which a medicine or the like is added to the aerosol source 22 instead of the perfume source 31 may also be employed as the configuration of the aerosol generation source used in the aerosol inhaler 1.

According to the aerosol inhaler 1 configured as described above, as indicated by an arrow A in FIG. 3, air flowing in from the air inlet 11i provided in the power supply unit case 11 passes through the vicinity of the load 21 of the first cartridge 20 via the gap formed between the through hole 13b and the discharge terminal 41. The load 21 atomizes the aerosol source 22 drawn by the wick 24 from the reservoir 23. The aerosol generated by the atomization flows through the aerosol flow path 25 together with the air flowing in from the inlet, and is supplied to the second cartridge 30 via the communication path 17c. The aerosol supplied to the second cartridge 30 passes through the perfume source 31 so as to be perfumed, and is then supplied to the inhale port 32.

The aerosol inhaler 1 is provided with the notification unit 45 that notifies various types of information (see FIG. 5). The notification unit 45 may be constituted by a light emitting element, a vibrating element, or a sound output element. The notification unit 45 may also be a combination of two or more elements among the light emitting element, the vibrating element, and the sound output element. The notification unit 45 may be provided in any one of the power supply unit 10, the first cartridge 20, and the second cartridge 30, and is preferably provided in the power supply unit 10, which is not a consumable item.

In the present embodiment, an organic light emitting diode (OLED) panel 46 and a vibrator 47 are provided as the notification unit 45. When an organic light emitting diode (OLED) provided in the OLED panel 46 emits light, various types of information are notified to the user via the display device 16. Further, when the vibrator 47 vibrates, various types of information are notified to the user via the power supply unit case 11. The notification unit 45 may be provided with only one of the OLED panel 46 and the vibrator 47, or may be provided with another light emitting element or the like. The information notified by the OLED panel 46 and the information notified by the vibrator 47 may be different or the same.

(Electric Circuit)

Next, details of an electric circuit of the power supply unit 10 will be described with reference to FIG. 4.

Figure 4:
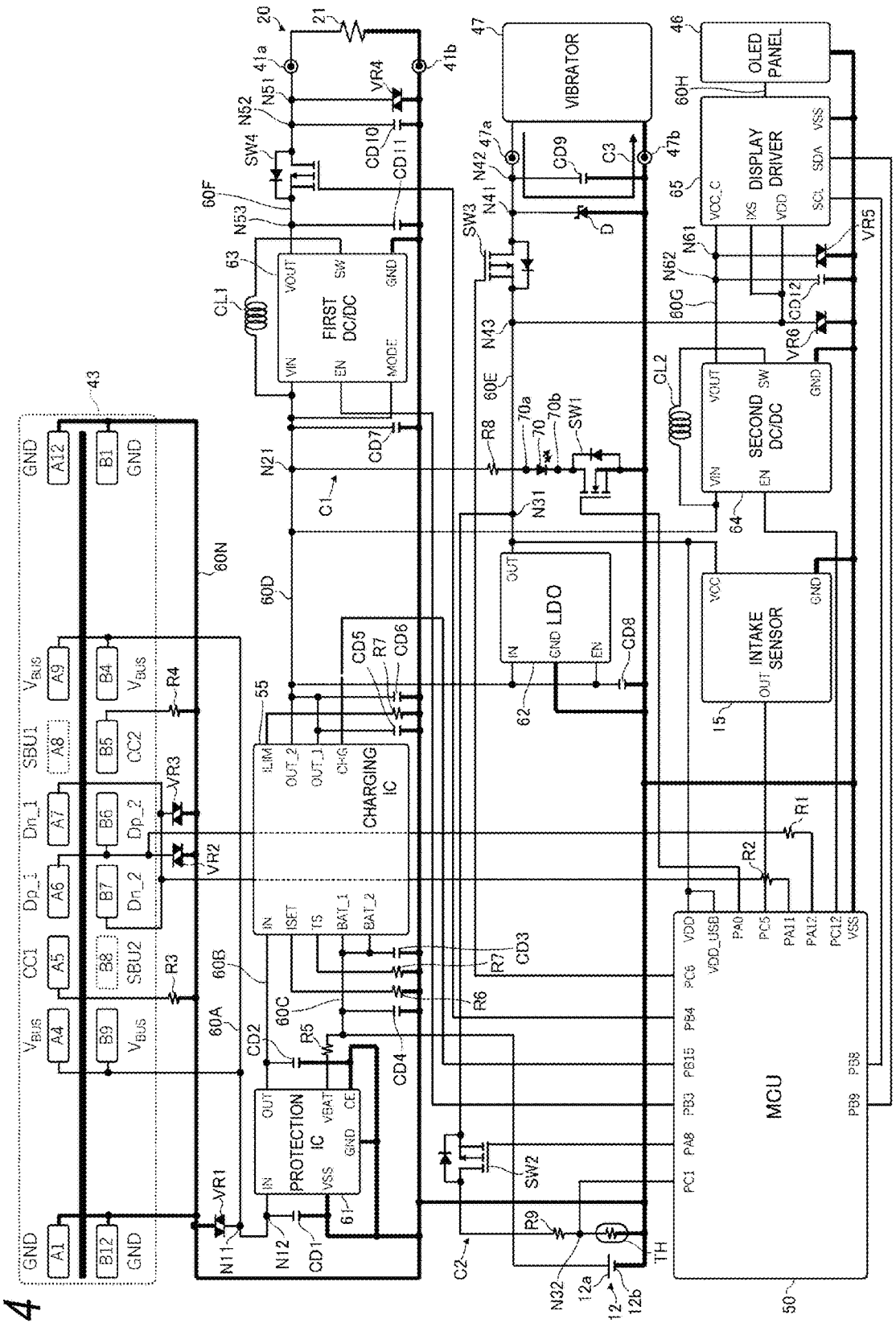
FIG. 4 shows a circuit configuration of a power supply unit of the aerosol inhaler shown in FIG. 1.

As shown in FIG. 4, the power supply unit 10 includes, as main components, the power supply 12, the charge terminal 43, the MCU 50, the charging IC 55, a protection IC 61, a low drop-out (LDO) regulator 62, a first DC/DC converter 63, a second DC/DC converter 64, a display driver 65, the intake sensor 15, the OLED panel 46, and the vibrator 47.

As described above, the charge terminal 43 is a receptacle to which the mating side plug can be fitted, and includes a plurality of pins (terminals) that are electrically connected to a pin of the plug when the plug is fitted. Specifically, the charge terminal 43 includes an A1 pin (indicated by "A1" in the drawings), an A4 pin (indicated by "A4" in the drawings), an A5 pin (indicated by "A5" in the drawings), an A6 pin (indicated by "A6" in the drawings), an A7 pin (indicated by "A7" in the drawings), an A8 pin (indicated by "A8" in the drawings), an A9 pin (indicated by "A9" in the drawings), an A12 pin (indicated by "A12" in the drawings), a B1 pin (indicated by "B1" in the drawings), a B4 pin (indicated by "B4" in the drawings), a B5 pin (indicated by "B5" in the drawings), a B6 pin (indicated by "B6" in the drawings), a B7 pin (indicated by "B7" in the drawings), a B8 pin (indicated by "B8" in the drawings), a B9 pin (indicated by "B9" in the drawings), and a B12 pin (indicated by "B12" in the drawings).

The A1 pin, the A4 pin, the A5 pin, the A6 pin, the A7 pin, the A8 pin, the A9 pin, the A12 pin, and the B1 pin, the B4 pin, the B5 pin, the B6 pin, the B7 pin, the B8 pin, the B9 pin, the B12 pin are arranged to be point symmetrical relative to a center of a fitting surface where the charge terminal 43 is fitted with the plug. Therefore, the plug can be fitted to the charge terminal 43 regardless of an up-down orientation of the plug, and convenience for the user can thus be improved.

It should be noted that only main pins among the pins included in the charge terminal 43 are described in the present embodiment. Although the A8 pin and the B8 pin are provided in the charge terminal 43 in the present embodiment, as will be described later below, such pins are not used and may be omitted.

The protection IC 61 is an IC having a function of converting a voltage input via the charge terminal 43 into a predetermined voltage as necessary and outputting the converted voltage. Specifically, the protection IC 61 converts the input voltage into a voltage included in a range between a minimum value and a maximum value of a recommended input voltage of the charging IC 55. As a result, even when a high voltage exceeding the maximum value of the recommended input voltage of the charging IC 55 is input via the charge terminal 43, the protection IC 61 can protect the charging IC 55 from the high voltage. As an example, when the minimum value of the recommended input voltage of the charging IC 55 is 4.35 [V] while the maximum value is 6.4 [V], the protection IC 61 converts the input voltage into 5.5±0.2 [V] and outputs the converted voltage to the charging IC 55. When the above-described high voltage is input via the charge terminal 43, the protection IC 61 may protect the charging IC 55 by opening a circuit that connects an input terminal (denoted by IN in FIG. 4) and an output terminal (denoted by OUT in FIG. 4) of the protection IC 61. The protection IC 61 may also have various protection functions for protecting the electric circuit of the power supply unit 10, such as overcurrent detection and overvoltage detection.

The protection IC 61 includes a plurality of pins (terminals) configured to electrically connect inside and outside of the protection IC 61. Specifically, the protection IC 61 includes an IN pin (indicated by "IN" in the drawings), a VSS pin (indicated by "VSS" in the drawings), a GND pin (indicated by "GND" in the drawings), an OUT pin (indicated by "OUT" in the drawings), a VBAT pin (indicated by "VBAT" in the drawings), and a CE pin (indicated by "CE" in the drawings).

In the protection IC 61, the IN pin is a pin to which the power supplied from the charge terminal 43 is input. The VSS pin is a pin to which power for operating the protection IC 61 is input. The GND pin is a grounded pin. The OUT pin is a pin that outputs power to the charging IC 55. The VBAT pin is a pin for the protection IC 61 to detect a state of the power supply 12. The CE pin is a pin that switches ON and OFF of the protection functions provided by the protection IC 61. It should be noted that only main pins among the pins included in the protection IC 61 are described in the present embodiment.

The charging IC 55 is an IC which has a function of controlling charging to the power supply 12 and a function of supplying power of the power supply 12 to the LDO regulator 62, the first DC/DC converter 63, the second DC/DC converter 64, and the like. For example, the charging IC 55 supplies a standard system voltage corresponding to an output of the power supply 12 at that time to the LDO regulator 62, the first DC/DC converter 63, the second DC/DC converter 64, and the like. Here, the standard system voltage refers to a voltage that is higher than a low-voltage system voltage to be described later below and lower than a first high-voltage system voltage and a second high-voltage system voltage. The standard system voltage is, for example, the output voltage of the power supply 12, and can be a voltage of about 3 to 4.2 [V].

Further, the charging IC 55 also has a power-path function of supplying the power input via the charge terminal 43 to systems such as the LDO regulator 62, the first DC/DC converter 63, and the second DC/DC converter 64. By using this power-path function, power can be supplied to the systems of the power supply unit 10, such as the LDO regulator 62, the first DC/DC converter 63, and the second DC/DC converter 64 even during charging of the power supply 12. Therefore, when such systems of the power supply unit 10 are used during charging of the power supply 12, such systems of the power supply unit 10 can be used while a burden of the power supply 12 is reduced (that is, deterioration of the power supply 12 is prevented). In addition, it is also possible to improve a charging speed of the power supply 12 and shorten a charging time thereof. Even when the power supply 12 is over-discharged, it is possible to use the power-path function to restore the systems of the power supply unit 10.

The charging IC 55 includes a plurality of pins (terminals) configured to electrically connect inside and outside of the charging IC 55. Specifically, the charging IC 55 includes an IN pin (indicated by "IN" in the drawings), a BAT_1 pin (indicated by "BAT_1" in the drawings), a BAT_2 pin (indicated by "BAT_2" in the drawings), an ISET pin (indicated by "ISET" in the drawings), a TS pin (indicated by "TS" in the drawings), an OUT_1 pin (indicated by "OUT_1" in the drawings), an OUT_2 pin (indicated by "OUT_2" in the drawings), an ILIM pin (indicated by "ILIM" in the drawings), and a CHG pin (indicated by "CHG" in the drawings).

It should be noted that only main pins among the pins included in the charging IC 55 are described in the present embodiment. Although the charging IC 55 is provided with the BAT_1 pin and the BAT_2 pin in the present embodiment, the BAT_1 pin and the BAT_2 pin may also be combined as one single pin. Similarly, although the charging IC 55 is provided with the OUT_1 pin and the OUT_2 pin in the present embodiment, the OUT_1 pin and the OUT_2 pin may also be combined as one single pin.

The LDO regulator 62 is an IC which has a function of generating the low-voltage system voltage from the input standard system voltage and outputting the generated low-voltage system voltage. Here, the low-voltage system voltage refers to a voltage lower than the standard system voltage described above, and is, for example, a voltage suitable for operating the MCU 50 and the intake sensor 15. An example of the low-voltage system voltage is 2.5 [V].

The LDO regulator 62 includes a plurality of pins (terminals) configured to electrically connect inside and outside of the LDO regulator 62. Specifically, the LDO regulator 62 includes an IN pin (indicated by "IN" in the drawings), a GND pin (indicated by "GND" in the drawings), an OUT pin (indicated by "OUT" in the drawings), and an EN pin (indicated by "EN" in the drawings). It should be noted that only main pins among the pins provided in the LDO regulator 62 are described in the present embodiment.

The MCU 50 is an IC that operates through using the input low-voltage system voltage as a power source and functions as a control device that performs various types of control of the aerosol inhaler 1. For example, the MCU 50 can control heating of the load 21 by controlling on and off of a switch SW4, which will be described later below, provided in the electric circuit of the power supply unit 10. The MCU 50 can also control a display of the display device 16 by controlling the display driver 65. Further, the MCU 50 can control vibration of the vibrator 47 by controlling on and off of a switch SW3, which will be described later below, provided in the electric circuit of the power supply unit 10.

The MCU 50 includes a plurality of pins (terminals) configured to electrically connect inside and outside of the MCU 50. Specifically, the MCU 50 includes a VDD pin (indicated by "VDD" in the drawings), a VDD_USB pin (indicated by "VDD_USB" in the drawings), a VSS pin (indicated by "VSS" in the drawings), a PC1 pin (indicated by "PC1" in the drawings), a PA8 pin (indicated by "PA8" in the drawings), a PB3 pin (indicated by "PB3" in the drawings), a PB15 pin (indicated by "PB15" in the drawings), a PB4 pin (indicated by "PB4" in the drawings), a PC6 pin (indicated by "PC6" in the drawings), a PA0 pin (indicated by "PA0" in the drawings), a PC5 pin (indicated by "PC5" in the drawings), a PA11 pin (indicated by "PA11" in the drawings), a PA12 pin (indicated by "PA12" in the drawings), a PC12 pin (indicated by "PC12" in the drawings), a PB8 pin (indicated by "PB8" in the drawings), and a PB9 pin (indicated by "PB9" in the drawings).

It should be noted that only main pins among the pins provided in the MCU 50 are described in the present embodiment. Although the MCU 50 is provided with the VDD pin and the VDD_USB pin in the present embodiment, the VDD pin and the VDD_USB pin may also be combined as one single pin.

The intake sensor 15 is a sensor device that detects the puff operation as described above, and is, for example, a sensor device configured to output a signal indicating, as a detection result, a value of a change in pressure (internal pressure) in the power supply unit 10 caused by inhale of the user through the inhale port 32 as will be described later below.

The intake sensor 15 includes a plurality of pins (terminals) configured to electrically connect inside and outside of the intake sensor 15. Specifically, the intake sensor 15 includes a VCC pin (indicated by "VCC" in the drawings), a GND pin (indicated by "GND" in the drawings), and an OUT pin (indicated by "OUT" in the drawings). It should be noted that only main pins among the pins included in the intake sensor 15 are described in the present embodiment.

The vibrator 47 includes, for example, a positive electrode side terminal 47*a*, a negative electrode side terminal 47*b*, a motor (not shown) that rotates a rotation shaft in accordance with a voltage input from the positive electrode side terminal 47*a* and the negative electrode side terminal 47*b*, and an eccentric weight (not shown) attached to the rotation shaft of the motor. When the low-voltage system voltage is input to the vibrator 47, the motor and the eccentric weight are rotated to generate vibration.

In the present specification, the term "positive electrode side" refers to a higher potential side as compared with the "negative electrode side". That is, in the following description, the term "positive electrode side" may be read as a "high potential side". In the present specification, the term "negative electrode side" refers to a lower potential side as compared with the "positive electrode side". That is, in the following description, the term "negative electrode side" may be read as a "low potential side".

The first DC/DC converter 63 is an IC which has a function of generating the first high-voltage system voltage from the input standard system voltage and outputting the generated first high-voltage system voltage. Here, the first high-voltage system voltage refers to a voltage higher than the standard system voltage described above. That is, the first DC/DC converter 63 boosts the input standard system voltage to the first high-voltage system voltage and outputs the first high-voltage system voltage. The first high-voltage system voltage is, for example, a voltage suitable for heating the load 21, and is, as an example, 4.2 [V].

The first DC/DC converter 63 includes a plurality of pins (terminals) configured to electrically connect inside and outside of the first DC/DC converter 63. Specifically, the first DC/DC converter 63 includes a VIN pin (indicated by "VIN" in the drawings), a SW pin (indicated by "SW" in the drawings), a GND pin (indicated by "GND" in the drawings), a VOUT pin (indicated by "VOUT" in the drawings), a MODE pin (indicated by "MODE" in the drawings), and an EN pin (indicated by "EN" in the drawings). It should be noted that only main pins among the pins included in the first DC/DC converter 63 are described in the present embodiment.

The second DC/DC converter 64 is an IC which has a function of generating the second high-voltage system voltage from the input standard system voltage and outputting the generated second high-voltage system voltage. Here, the second high-voltage system voltage refers to a voltage higher than the standard system voltage described above. That is, the second DC/DC converter 64 boosts the input standard system voltage to the second high-voltage system voltage and outputs the second high-voltage system voltage. The second high-voltage system voltage is higher than the first high-voltage system voltage, and is, for example, a voltage suitable for operating the OLED panel 46. Specifically, the second high-voltage system voltage is, for example, about 10 to 15 [V].

The second DC/DC converter 64 includes a plurality of pins (terminals) configured to electrically connect inside and outside of the second DC/DC converter 64. Specifically, the second DC/DC converter 64 includes a VIN pin (indicated by "VIN" in the drawings), a SW pin (indicated by "SW" in the drawings), a GND pin (indicated by "GND" in the drawings), a VOUT pin (indicated by "VOUT" in the drawings), and an EN pin (indicated by "EN" in the drawings). It should be noted that only main pins among the pins included in the second DC/DC converter 64 are described in the present embodiment.

The display driver 65 is an IC that operates through using the input low-voltage system voltage as a power source, and has a function of controlling the OLED panel 46 and supplying the second high-voltage system voltage to the OLED panel 46 to control the display of the display device 16.

The display driver 65 includes a plurality of pins (terminals) configured to electrically connect inside and outside of the display driver 65. Specifically, the display driver 65 includes a VDD pin (indicated by "VDD" in the drawings), a VSS pin (indicated by "VSS" in the drawings), a VCC_C pin (indicated by "VCC_C" in the drawings), an SDA pin (indicated by "SDA" in the drawings), an SCL pin (indicated by "SCL" in the drawings), and an IXS pin (indicated by "IXS" in the drawings). It should be noted that only main pins among the pins included in the display driver 65 are described in the present embodiment.

The components of the power supply unit 10 described above are electrically connected to each other by a conducting wire or the like provided on the circuit board 60. Hereinafter, electric connection of each component of the power supply unit 10 will be described in detail.

The A1 pin, the A12 pin, the B1 pin and the B12 pin of the charge terminal 43 are ground pins. The A1 pin and the B12 pin are connected in parallel, and are grounded by a ground line 60N. Similarly, the A12 pin and the B1 pin are also connected in parallel, and are grounded by the ground line 60N. In FIG. 4, the ground line 60N (that is, a line of approximately 0 [V], which is a reference potential of the circuit board 60) is indicated by a thick solid line.

The A4 pin, the A9 pin, the B4 pin, and the B9 pin of the charge terminal 43 are pins that receive an input of power to the power supply unit 10 when a plug of the external power supply is fitted to the charge terminal 43. For example, when the plug is fitted to the charge terminal 43, predetermined USB bus power is supplied from the fitted plug to the power supply unit 10 via the A4 pin and the B9 pin or the A9 pin and the B4 pin. Power corresponding to USB power delivery (USBPD) may also be supplied to the power supply unit 10 from the plug of the external power supply which is fitted to the charge terminal 43.

Specifically, the A4 pin and the B9 pin are connected in parallel, and are connected to the IN pin of the protection IC 61 via a power supply line 60A. The IN pin of the protection IC 61 is a positive electrode side power supply pin of the protection IC 61. The A9 pin and the B4 pin are also connected in parallel, and are connected to the IN pin of the protection IC 61 via the power supply line 60A.

The power supply line 60A is connected to the ground line 60N via a varistor (variable resistor: nonlinear resistance element) VR1. Specifically, one end of the varistor VR1 is connected to a node N11 provided on the power supply line 60A, while the other end is connected to the ground line 60N. Here, the node N11 is provided closer to the protection IC 61 as compared with a node connected to the A4 pin and the B9 pin and a node connected to the A9 pin and the B4 pin on the power supply line 60A. Therefore, for example, even if static electricity is generated in the A4 pin, the A9 pin, the B4 pin, or the B9 pin due to friction between the charge terminal 43 and the plug when the plug is fitted to the charge terminal 43, the static electricity can be released to the ground line 60N via the varistor VR1 so as to protect the protection IC 61.

The power supply line 60A is connected to the ground line 60N via a capacitor CD1 that functions as a decoupling capacitor (also referred to as a bypass capacitor). As a result, a voltage input to the protection IC 61 via the power supply line 60A can be stabilized. Specifically, one end of the capacitor CD1 is connected to a node N12 provided on the power supply line 60A, while the other end is connected to the ground line 60N. Here, the node N12 is provided closer to the protection IC 61 as compared with the node N11 on the power supply line 60A. Therefore, even if static electricity is generated in the A4 pin, the A9 pin, the B4 pin, or the B9 pin, the capacitor CD1 can be protected by the varistor VR1 from the static electricity. That is, by providing the node N12 which is closer to the protection IC 61 as compared with the node N11 on the power supply line 60A, the protection IC 61 can be protected from overvoltage while a stable operation of the protection IC 61 can be achieved.

The A6 pin, the A7 pin, the B6 pin, and the B7 pin of the charge terminal 43 are pins used to input and output signals for communication between the power supply unit 10 and an external device. In the present embodiment, serial communication during which signals are differentially transmitted by two signal lines Dp (also referred to as D+) and Dn (also referred to as D−) is used for the communication between the power supply unit 10 and the external device.

The A6 pin and the B6 pin are pins corresponding to a Dp side signal line. The A6 pin and the B6 pin are connected in parallel, and are connected to the PA12 pin of the MCU 50 via a resistor R1. The resistor R1 is an element which includes a resistance element, a transistor, or the like and has a predetermined electric resistance value. The PA12 pin of the MCU 50 is a pin used to input and output a signal of the MCU 50. Therefore, a Dp side signal from the external device can be input to the MCU 50 via the A6 pin or the B6 pin. A Dp side signal from the MCU 50 can also be output to the external device via the A6 pin or the B6 pin.

The A6 pin and the B6 pin are also connected to the ground line 60N via a varistor VR2. Therefore, for example, even if static electricity is generated in the A6 pin or the B6 pin due to the friction between the charge terminal 43 and the plug when the plug is fitted to the charge terminal 43, the static electricity can be released to the ground line 60N via the varistor VR2 so as to protect the MCU 50. Further, since the resistor R1 is provided between the A6 pin, the B6 pin and the MCU 50, the resistor R1 can also prevent input of a high voltage to the MCU 50, and the MCU 50 can thus be protected.

The A7 pin and the B7 pin are pins corresponding to a Dn side signal line. The A7 pin and the B7 pin are connected in parallel, and are connected to the PA11 pin of the MCU 50 via a resistor R2. The resistor R2 is an element which includes a resistance element, a transistor, or the like and has a predetermined electric resistance value. The PA11 pin of the MCU 50 is a pin used to input and output the signal of the MCU 50. Therefore, a Dn side signal from the external device can be input to the MCU 50 via the A7 pin or the B7 pin. A Dn side signal from the MCU 50 can also be output to the external device via the A7 pin or the B7 pin.

The A7 pin and the B7 pin are also connected to the ground line 60N via a varistor VR3. Therefore, for example, even if static electricity is generated in the A7 pin or the B7 pin due to the friction between the charge terminal 43 and the plug when the plug is fitted to the charge terminal 43, the static electricity can be released to the ground line 60N via the varistor VR3 so as to protect the MCU 50. Further, since the resistor R2 is provided between the A7 pin, the B7 pin and the MCU 50, the resistor R2 can also prevent the input of the high voltage to the MCU 50, and the MCU 50 can thus be protected.

The A5 pin and the B5 pin of the charge terminal 43 are pins used to detect the up-down orientation of the plug which is fitted to the charge terminal 43. For example, the A5 pin is a pin corresponding to a signal line of a so-called CC1 signal, while the B5 pin is a pin corresponding to a signal line of a so-called CC2 signal. The A5 pin is connected to the ground line 60N via a resistor R3, while the B5 pin is connected to the ground line 60N via a resistor R4.

The A8 pin and the B8 pin of the charge terminal 43 are not connected to the electric circuit of the power supply unit 10. Therefore, the A8 pin and the B8 pin are not used, and may be omitted.

As described above, the IN pin of the protection IC 61 is the positive electrode side power supply pin of the protection IC 61, and is connected to the power supply line 60A. The VSS pin of the protection IC 61 is a negative electrode side power supply pin of the protection IC 61, and is connected to the ground line 60N. The GND pin of the protection IC 61 is a ground pin of the protection IC 61, and is connected to the ground line 60N. As a result, when the plug is fitted to the charge terminal 43, power (for example, USB bus power) is supplied to the protection IC 61 via the power supply line 60A.

The OUT pin of the protection IC 61 is a pin that directly outputs power input to the IN pin or outputs a voltage converted by the protection IC 61 (for example, 5.5±0.2 [V]), and is connected to the IN pin of the charging IC 55 via a power supply line 60B. The IN pin of the charging IC 55 is a positive electrode side power supply pin of the charging IC 55. As a result, an appropriate voltage converted by the protection IC 61 is supplied to the charging IC 55.

The power supply line 60B is connected to the ground line 60N via a capacitor CD2 which functions as a decoupling capacitor. As a result, a voltage input to the charging IC 55 via the power supply line 60B can be stabilized.

The VBAT pin of the protection IC 61 is a pin used by the protection IC 61 to detect whether the power supply 12 is connected, and is connected to a positive electrode side terminal 12a of the power supply 12 via a resistor R5. The resistor R5 is an element which includes a resistance element, a transistor, or the like and has a predetermined electric resistance value. The protection IC 61 can detect that the power supply 12 is connected based on a voltage input to the VBAT pin.

The CE pin of the protection IC 61 is a pin configured to turn on and off an operation (various functions) of the protection IC 61. Specifically, the protection IC 61 operates when a low-level voltage is input to the CE pin, and stops the operation when a high-level voltage is input to the CE pin. In the present embodiment, the CE pin of the protection IC 61 is connected to the ground line 60N, and the low-level voltage is always input to the CE pin. Therefore, the protection IC 61 always operates during a supply of power, and performs conversion to a predetermined voltage, overcurrent detection, overvoltage detection, and the like.

Instead of the protection IC 61 in the present embodiment, a protection IC that operates when a high-level voltage is input to a CE pin and stops the operation when a low-level voltage is input to the CE pin may be used. However, it should be noted that the CE pin of the protection IC in this case needs to be connected to the power supply line 60B or the power supply line 60A instead of the ground line 60N.

As described above, the IN pin of the charging IC 55 is the positive electrode side power supply pin of the charging IC 55, and is connected to the power supply line 60B. The charging IC 55 is also connected to the ground line 60N by, for example, a negative electrode side power supply pin (not shown). As a result, a voltage output from the protection IC 61 is supplied to the charging IC 55 via the power supply line 60B.

The BAT_1 pin and the BAT_2 pin of the charging IC 55 are pins used to exchange power between the charging IC 55 and the power supply 12, and are connected to the positive electrode side terminal 12a of the power supply 12 via a power supply line 60C. A negative electrode side terminal 12b of the power supply 12 is connected to the ground line 60N.

Specifically, the BAT_1 pin and the BAT_2 pin are connected in parallel, connected to the positive electrode side terminal 12a and connected to the ground line 60N via a capacitor CD3. When the power supply 12 is discharged, electric charges are accumulated in the capacitor CD3, and a voltage output from the power supply 12 is input to the BAT_1 pin and the BAT_2 pin. When the power supply 12 is charged, a voltage for charging the power supply 12 is output from the BAT_1 pin and the BAT_2 pin, and is applied to the positive electrode side terminal 12a of the power supply 12 via the power supply line 60C.

The power supply line 60C is connected to the ground line 60N via a capacitor CD4 which functions as a decoupling capacitor. As a result, a voltage input to the power supply 12 via the power supply line 60C can be stabilized.

The ISET pin of the charging IC 55 is a pin configured to set a current value output from the charging IC 55 to the power supply 12. In the present embodiment, the ISET pin is connected to the ground line 60N via a resistor R6. Here, the resistor R6 is an element which includes a resistance element, a transistor, or the like and has a predetermined electric resistance value.

The charging IC 55 outputs, to the power supply 12, a current which has a current value corresponding to the electric resistance value of the resistor R6 connected to the ISET pin.

The TS pin of the charging IC 55 is a pin to which a voltage value applied to a resistor connected thereto is input, and is a pin which is used to detect an electric resistance value and a temperature of the resistor connected to the TS pin based on the voltage value. In the present embodiment, the TS pin is connected to the ground line 60N via a resistor R7. Here, the resistor R7 is an element (for example, a thermistor) which includes a resistance element, a transistor, or the like and has a predetermined electric resistance value. Therefore, the charging IC 55 can detect an electric resistance value and a temperature of the resistor R7 based on a voltage value applied to the resistor R7.

The CHG pin of the charging IC 55 is a pin that outputs information on a charging state of the power supply 12 (hereinafter, also referred to as charging state information), such as charging, charging stopped, and charging completed, and information on the remaining capacity of the power supply 12 (hereinafter, also referred to as remaining capacity information). The CHG pin of the charging IC 55 is connected to the PB15 pin of the MCU 50. The PB15 pin of the MCU 50 is a pin used to input a signal in the MCU 50. Therefore, the charging IC 55 can notify the MCU 50 of the charging state, the remaining capacity, and the like of the power supply 12 by outputting the charging state information and the remaining capacity information from the CHG pin to the MCU 50.

The OUT_1 pin and the OUT_2 pin of the charging IC 55 are pins from which the standard system voltage is output, and are connected to the IN pin of the LDO regulator 62, the VIN pin of the first DC/DC converter 63, and the VIN pin of the second DC/DC converter 64 via a power supply line 60D. The IN pin of the LDO regulator 62 is a positive electrode side power supply pin of the LDO regulator 62. The VIN pin of the first DC/DC converter 63 is a positive electrode side power supply pin of the first DC/DC converter 63. The VIN pin of the second DC/DC converter 64 is a positive electrode side power supply pin of the second DC/DC converter 64.

Specifically, the OUT_1 pin is connected, via a capacitor CD5 which functions as a decoupling capacitor, to the ground line 60N and connected to the OUT_2 pin. The OUT_1 pin and the OUT_2 pin are connected, via a capacitor CD6 which functions as a decoupling capacitor, to the ground line 60N, and are also connected to the IN pin of the LDO regulator 62, the VIN pin of the first DC/DC converter 63, and the VIN pin of the second DC/DC converter 64. As a result, the charging IC 55 can stably supply the standard system voltage to the LDO regulator 62, the first DC/DC converter 63, and the second DC/DC converter 64.

Further, in the present embodiment, a capacitor CD7 which functions as a decoupling capacitor is also provided immediately before the first DC/DC converter 63 on the power supply line 60D. As a result, the standard system voltage can be stably supplied to the first DC/DC converter 63, while power supply from the first DC/DC converter 63 to the load 21 can be stabilized.

The ILIM pin of the charging IC 55 is a pin configured to set an upper limit of a current value output from the charging IC 55 to the LDO regulator 62, the first DC/DC converter 63, and the second DC/DC converter 64. In the present embodiment, the ILIM pin is connected to the ground line 60N via the resistor R7. Here, the resistor R7 is an element which includes a resistance element, a transistor, or the like and has a predetermined electric resistance value.

The charging IC 55 outputs, to the LDO regulator 62, the first DC/DC converter 63, and the second DC/DC converter 64, a current whose upper limit has a current value corresponding to the electric resistance value of the resistor R7 connected to the ILIM pin. More specifically, the charging IC 55 outputs a current having a current value corresponding to the electric resistance value of the resistor R6 connected to the ISET pin from the OUT_1 pin and the OUT_2 pin, and stops outputting the current from the OUT_1 pin and the OUT_2 pin when the current value reaches the current value corresponding to the electric resistance value of the resistor R7 connected to the ILIM pin. That is, a manufacturer of the aerosol inhaler 1 can set the upper limit value of the current output from the charging IC 55 to the LDO regulator 62, the first DC/DC converter 63, and the second DC/DC converter 64 by the electric resistance value of the resistor R7 connected to the ILIM pin.

An LED circuit C1 is provided by branching from the power supply line 60D. The LED circuit C1 is configured by connecting a resistor R8, an LED 70, and a switch SW1 in series. One end of the LED circuit C1 on the side of the resistor R8 is connected to a node N21 provided on the power supply line 60D. The other end of the LED circuit C1 on the side of the switch SW1 is connected to the ground line 60N.

Here, the resistor R8 is an element which includes a resistance element, a transistor, or the like and has a predetermined electric resistance value. The resistor R8 is mainly used to limit a voltage applied to the LED 70 and/or a current supplied to the LED 70. The LED 70 is a light emitting unit that is provided at a position corresponding to the remaining amount check window 11w inside the power supply unit 10 and is configured to illuminate an outer side of the power supply unit 10 from the inside of the power supply unit 10 via the remaining amount check window 11w. The LED 70 emits light to improve visibility of a remaining amount of the first cartridge 20 (specifically, a remaining amount of the aerosol source 22 stored in the first cartridge 20) seen via the remaining amount check window 11w.

The switch SW1 is, for example, a switch configured by a MOSFET. The switch SW1 is connected to the MCU 50 which will be described later below. The switch SW1 is turned on in response to an ON command of the MCU 50, and is turned off in response to an OFF command of the MCU 50. The LED circuit C1 is brought into a conductive state when the switch SW1 is turned on. Then the LED 70 emits light when the LED circuit C1 is in the conductive state.

As described above, the IN pin of the LDO regulator 62 is the positive electrode side power supply pin of the LDO regulator 62, and is connected to the power supply line 60D. The GND pin of the LDO regulator 62 is a ground pin of the LDO regulator 62, and is connected to the ground line 60N. As a result, the standard system voltage output from the charging IC 55 is supplied to the LDO regulator 62 via the power supply line 60D.

The OUT pin of the LDO regulator 62 is a pin to which the low-voltage system voltage generated by the LDO regulator 62 is output, and is connected to the VDD pin and the VDD_USB pin of the MCU 50, the VCC pin of the intake sensor 15, the VDD pin and the IXS pin of the display driver 65, and the positive electrode side terminal 47a of the vibrator 47 via a power supply line 60E. The VDD pin and the VDD_USB pin of the MCU 50 are positive electrode side power supply pins of the MCU 50. The VCC pin of the intake sensor 15 is a positive electrode side power supply pin of the intake sensor 15. The VDD pin of the display driver 65 is a positive electrode side power supply pin of the display driver 65. As a result, the LDO regulator 62 can supply the low-voltage system voltage to the MCU 50, the intake sensor 15, the display driver 65, and the vibrator 47.

The EN pin of the LDO regulator 62 is a pin configured to turn on and off an operation (function) of the LDO regulator 62. Specifically, the LDO regulator 62 operates when a high-level voltage is input to the EN pin, and stops the operation when the high-level voltage is not input to the EN pin.

In the present embodiment, the EN pin of the LDO regulator 62 is connected to the power supply line 60D and is also connected to the ground line 60N via a capacitor CD8. Therefore, when the standard system voltage is output from the charging IC 55, electric charges are accumulated in the capacitor CD8, the high-level voltage is input to the EN pin of the LDO regulator 62, and thus the LDO regulator 62 is operated to output the low-voltage system voltage from the LDO regulator 62.

As described above, the VDD pin and the VDD_USB pin of the MCU 50 are the positive electrode side power supply pins of the MCU 50, and are connected to the power supply line 60E. The VSS pin of the MCU 50 is a negative electrode side power supply pin of the MCU 50, and is connected to the ground line 60N. As a result, the low-voltage system voltage output from the LDO regulator 62 is supplied to the MCU 50 via the power supply line 60E. The VDD pin and the VDD_USB pin may also be combined as one single pin.

A thermistor circuit C2 is provided by branching from the power supply line 60E. The thermistor circuit C2 is configured by connecting a switch SW2, a resistor R9, and a thermistor TH in series. One end of the thermistor circuit C2 on the side of the switch SW2 is connected to a node N31 provided on the power supply line 60E. The other end of the thermistor circuit C2 on the side of the thermistor TH is connected to the ground line 60N.

Here, the switch SW2 is, for example, a switch configured by a MOSFET. The switch SW2 is connected to the MCU 50 which will be described later below. The switch SW2 is turned on in response to the on command of the MCU 50, and is turned off in response to the off command of the MCU

50. The thermistor circuit C2 is brought into a conductive state when the switch SW2 is turned on.

The resistor R9 is an element which includes a resistance element, a transistor, or the like and has a predetermined electric resistance value. The thermistor TH includes an element having negative temperature coefficient (NTC) characteristics or positive temperature coefficient (PTC) characteristics, that is, an element having a correlation between an electric resistance value and a temperature, and the like. The thermistor TH is arranged in the vicinity of the power supply 12 so as to be capable of detecting a temperature of the power supply 12.

The PC1 pin of the MCU 50 is connected to a node N32 provided between the resistor R9 and the thermistor TH in the thermistor circuit C2. When the thermistor circuit C2 is in the conductive state (that is, when the switch SW2 is on), a voltage divided by the resistor R9 and the thermistor TH is input to the PC1 pin. The MCU 50 can detect a temperature of the thermistor TH, that is, the temperature of the power supply 12, based on a voltage value input to the PC1 pin.

The PA8 pin of the MCU 50 is a pin that is connected to the switch SW2 and outputs the ON command to turn on the switch SW2 or outputs the OFF command to turn off the switch SW2. The MCU 50 can turn on the switch SW2 and brought the thermistor circuit C2 into the conductive state by outputting the ON command from the PA8 pin. The MCU 50 can turn off the switch SW2 and brought the thermistor circuit C2 into a non-conductive state by outputting the OFF command from the PA8 pin. As a specific example, when the switch SW2 is the switch configured by the MOSFET, the PA8 pin of the MCU 50 is connected to a gate terminal of the MOSFET. The MCU 50 can control on and off of the switch SW2 by controlling a gate voltage applied to the gate terminal (that is, output from the PA8 pin).

On the power supply line 60E, a switch SW3 is provided before the positive electrode side terminal 47a of the vibrator 47. Here, the switch SW3 is, for example, a switch configured by a MOSFET. The switch SW3 is connected to the MCU 50. The switch SW3 is turned on in response to the ON command of the MCU 50, and is turned off in response to the OFF command of the MCU 50.

Specifically, the PC6 pin of the MCU 50 is a pin that is connected to the switch SW3 and outputs the ON command to turn on the switch SW3 or outputs the OFF command to turn off the switch SW3. By outputting the ON command from the PC6 pin, the MCU 50 can turn on the switch SW3, supply power to the vibrator 47 through the power supply line 60E, and thus cause the vibrator 47 to vibrate. By outputting the OFF command from the PC6 pin, the MCU 50 can turn off the switch SW3 and stop the power supplied to the vibrator 47 through the power supply line 60E (that is, stop the vibration of the vibrator 47). As a specific example, when the switch SW3 is the switch configured by the MOSFET, the PC6 pin of the MCU 50 is connected to a gate terminal of the MOSFET. The MCU 50 can control on and off of the switch SW3 by controlling a gate voltage applied to the gate terminal (that is, output from the PC6 pin).

A Zener diode D is connected to the power supply line 60E. Specifically, one anode side end of the Zener diode D is connected to the ground line 60N, while the other cathode side end of the Zener diode D is connected to a node N41 provided on the power supply line 60E. Here, the node N41 is provided between the switch SW3 and the positive electrode side terminal 47a on the power supply line 60E. As a result, even when a counter electromotive force is generated from the vibrator 47 due to on and off of the vibrator 47, a current due to the counter electromotive force can be caused to flow through a closed circuit formed by the vibrator 47 and the Zener diode D as indicated by an arrow C3 in the drawing. Therefore, the current due to the counter electromotive force can be prevented from flowing to outside of the closed circuit formed by the vibrator 47 and the Zener diode D, and electronic components of the power supply unit 10 such as the power supply 12 and the LDO regulator 62 provided outside the closed circuit can thus be protected.

Further, a capacitor CD9 may be connected to the power supply line 60E. Specifically, in this case, one end of the capacitor CD9 is connected to a node N42 provided on the power supply line 60E, while the other end thereof is connected to the ground line 60N. Here, the node N42 is provided closer to the positive electrode side terminal 47a as compared with the node N41 on the power supply line 60E. In this way, the capacitor CD9 can be arranged in the above-described closed circuit formed by the vibrator 47 and the Zener diode D, and the capacitor CD9 can also protect the electronic components of the power supply unit 10 such as the power supply 12 and the LDO regulator 62 provided outside the closed circuit formed by the vibrator 47 and the Zener diode D. The capacitor CD9 may be provided in the vicinity of the closed circuit instead of being provided in the closed circuit described above. As a specific example, the capacitor CD9 may be provided between the switch SW3 and the Zener diode D. In this case, the capacitor CD9 and the Zener diode D can still protect the electronic components of the power supply unit 10 such as the power supply 12 and the LDO regulator 62.

The PB3 pin of the MCU 50 is a pin that is connected to the EN pin of the first DC/DC converter 63 and outputs a predetermined voltage signal. The MCU 50 can turn on and off an operation of the first DC/DC converter 63 based on the voltage signal output from the PB3 pin. Specifically, the MCU 50 can operate the first DC/DC converter 63 (that is, enable the first DC/DC converter 63) by outputting a high-level voltage signal from the PB3 pin. The MCU 50 can also stop the operation of the first DC/DC converter 63 (that is, disable the first DC/DC converter 63) by outputting a low-level voltage signal from the PB3 pin.

The PB4 pin of the MCU 50 is a pin that is connected to the switch SW4 (to be described later below) provided between the first DC/DC converter 63 and the discharge terminal 41. The PB4 pin outputs an ON command to turn on the switch SW4 or outputs an OFF command to turn off the switch SW4. The MCU 50 can supply power to the load 21, as will be described later below, by outputting the ON command from the PB4 pin to turn on the switch SW4. The MCU 50 can stop the supply of power to the load 21 by outputting the OFF command from the PB4 pin to turn off the switch SW4. As a specific example, when the switch SW4 is the switch configured by the MOSFET, the PB4 pin of the MCU 50 is connected to a gate terminal of the MOSFET. The MCU 50 can control on and off of the switch SW4 by controlling a gate voltage applied to the gate terminal (that is, output from the PB4 pin).

As described above, the PB15 pin of the MCU 50 is a pin that is connected to the CHG pin of the charging IC 55 and receives input of the charging state information and the remaining capacity information output by the charging IC 55.

The PA0 pin of the MCU 50 is a pin that is connected to the switch SW1 of the LED circuit C1. The PA0 pin outputs an ON command to turn on the switch SW1 or outputs an OFF command to turn off the switch SW1. As a specific example, when the switch SW1 is the switch configured by the MOSFET, the PA0 pin of the MCU 50 is connected to a gate terminal of the MOSFET. The MCU 50 can control on and off of the switch SW1 by controlling a gate voltage applied to the gate terminal (that is, output from the PA0 pin). The MCU 50 can bring the LED circuit C1 into the conductive state and cause the LED 70 to emit light (become lighted) by outputting the ON command from the PA0 pin to turn on the switch SW1. The MCU 50 can bring the LED circuit C1 into a non-conductive state and extinguish the LED 70 by outputting the OFF command from the PA0 pin to turn off the switch SW1. The MCU 50 can switch the LED circuit C1 between the conductive state and the non-conductive state at a high speed and blink the LED 70 by outputting the ON command and the OFF command from the PA0 pin while switching the ON command and the OFF command at a high speed.

The PC5 pin of the MCU 50 is a pin that is connected to the OUT pin of the intake sensor 15 and receives output of the intake sensor 15 (that is, a signal indicating a detection result of the intake sensor 15).

The PA11 pin and the PA12 pin of the MCU 50 are pins used to input and output signals for communication between the power supply unit 10 and the external device. Specifically, as described above, the PA11 pin is connected to the A7 pin and the B7 pin of the charge terminal 43 via the resistor R2, and is used to input and output the Dn side signal. As described above, the PA12 pin is connected to the A6 pin and the B6 pin of the charge terminal 43 via the resistor R1, and is used to input and output the Dp side signal.

The PC12 pin of the MCU 50 is a pin that is connected to the EN pin of the second DC/DC converter 64 and outputs a predetermined voltage signal. The MCU 50 can turn on and off an operation of the second DC/DC converter 64 based on the voltage signal output from the PC12 pin. Specifically, the MCU 50 can operate the second DC/DC converter 64 (that is, enable the second DC/DC converter 64) by outputting a high-level voltage signal from the PC12 pin. The MCU 50 can also stop the operation of the second DC/DC converter 64 (that is, disable the second DC/DC converter 64) by outputting a low-level voltage signal from the PC12 pin.

The PB8 pin and the PB9 pin of the MCU 50 are pins used to output a signal for communication between the MCU 50 and another IC, and are used for communication between the MCU 50 and the display driver 65 in the present embodiment. Specifically, in the present embodiment, the MCU 50 and the display driver 65 perform inter-integrated circuit (I2C) communication. The PB8 pin is used to output an SCL side signal of the I2C communication, while the PB9 pin is used to output an SDA side signal of the I2C communication. The MCU 50 can control the display driver 65 by signals output from PB8 pin and PB9 pin, and thus control display contents of the display device 16.

As described above, the VCC pin of the intake sensor 15 is the positive electrode side power supply pin of the intake sensor 15, and is connected to the power supply line 60E. The GND pin of the intake sensor 15 is a ground pin of the intake sensor 15, and is connected to the ground line 60N. As a result, the low-voltage system voltage output from the LDO regulator 62 is supplied to the intake sensor 15 via the power supply line 60E.

As described above, the OUT pin of the intake sensor 15 is the pin from which the signal indicating the detection result of the intake sensor 15 is output, and is connected to the PC5 pin of the MCU 50. As a result, the intake sensor 15 can notify the MCU 50 of the detection result.

As described above, the VIN pin of the first DC/DC converter 63 is the positive electrode side power supply pin of the first DC/DC converter 63, and is connected to the power supply line 60D. The VIN pin of the first DC/DC converter 63 is also connected to the SW pin (switch pin) of the first DC/DC converter 63 via a coil CL1. The GND pin of the first DC/DC converter 63 is a ground pin of the first DC/DC converter 63, and is connected to the ground line 60N.

The VOUT pin of the first DC/DC converter 63 is a pin from which the first high-voltage system voltage generated by the first DC/DC converter 63 is output, and is connected to a positive electrode side discharge terminal 41a of the discharge terminal 41 via a power supply line 60F. A negative electrode side discharge terminal 41b of the discharge terminal 41 is connected to the ground line 60N.

The power supply line 60F is provided with the switch SW4. The switch SW4 is, for example, a switch configured by a MOSFET or the like, and more specifically, is a power MOSFET having a high switching speed. The switch SW4 is connected to the MCU 50 as described above. The switch SW4 is turned on in response to the ON command of the MCU 50, and is turned off in response to the OFF command of the MCU 50. When the switch SW4 is turned on, the power supply line 60F is brought into a conductive state, and the first high-voltage system voltage is supplied to the load 21 via the power supply line 60F.

A varistor VR4 is connected to the power supply line 60F. Specifically, one end of the varistor VR4 is connected to a node N51 provided on the power supply line 60F, while the other end is connected to the ground line 60N. Here, the node N51 is provided closer to the positive electrode side discharge terminal 41a as compared with the switch SW4 on the power supply line 60F, that is, on an output side of the switch SW4. In other words, the varistor VR4 is connected between the discharge terminal 41 and the power supply 12, more specifically, between the discharge terminal 41 and the first DC/DC converter 63 (more specifically, the switch SW4).

Therefore, for example, even when static electricity is generated in the discharge terminal 41 due to friction between the discharge terminal 41 and the load 21 at the time of replacement of the first cartridge 20 or the like, the static electricity can be released to the ground line 60N via the varistor VR4 so as to protect the switch SW4, the first DC/DC converter 63, the power supply 12, and the like. Further, even if the varistor VR4 breaks down, the switch SW4 and the first DC/DC converter 63 can serve as a barrier against noise (in this case, the static electricity generated in the discharge terminal 41) for other elements (for example, the charging IC 55) located closer to the power supply 12 than the switch SW4 and the first DC/DC converter 63, and can protect the other elements.

A capacitor CD10 functioning as a decoupling capacitor is connected to the power supply line 60F. Specifically, one end of the capacitor CD10 is connected to a node N52 provided on the power supply line 60F, while the other end thereof is connected to the ground line 60N. Here, the node N52 is provided between the node N51 and the switch SW4 on the power supply line 60F. As a result, power supply from the switch SW4 to the load 21 can be stabilized. Even if the static electricity is generated in the discharge terminal 41, the capacitor CD10 can be protected from the static electricity by the varistor VR4.

Further, a capacitor CD11 functioning as a decoupling capacitor may be connected to the power supply line 60F. Specifically, in this case, one end of the capacitor CD11 is connected to a node N53 provided on the power supply line 60F, while the other end thereof is connected to the ground line 60N. Here, the node N53 is provided closer to the first DC/DC converter 63 as compared with the switch SW4 on the power supply line 60F. In other words, the capacitor CD11 is connected to an output side of the first DC/DC converter 63. As a result, power supply from the first DC/DC converter 63 to the switch SW4 (for example, the power MOSFET) can be stabilized. As a result, power supply to the load 21 can be stabilized.

As described above, the EN pin of the first DC/DC converter 63 is a pin configured to set on and off of an operation of the first DC/DC converter 63, and is connected to the PB3 pin of the MCU 50.

The MODE pin of the first DC/DC converter 63 is a pin configured to set an operation mode of the first DC/DC converter 63. The first DC/DC converter 63 is, for example, a switching regulator, and can have a pulse width modulation mode and a pulse frequency modulation mode as operation modes. In the present embodiment, by connecting the MODE pin to the power supply line 60D, a high-level voltage is input to the MODE pin when the first DC/DC converter 63 can operate, and the first DC/DC converter 63 is set to operate in the pulse width modulation mode.

As described above, the VIN pin of the second DC/DC converter 64 is the positive electrode side power supply pin of the second DC/DC converter 64, and is connected to the power supply line 60D. The VIN pin of the second DC/DC converter 64 is also connected to the SW pin (switch pin) of the second DC/DC converter 64 via a coil CL2. The GND pin of the second DC/DC converter 64 is a ground pin of the second DC/DC converter 64 and is connected to the ground line 60N.

The VOUT pin of the second DC/DC converter 64 is a pin from which the second high-voltage system voltage generated by the second DC/DC converter 64 is output, and is connected to the VCC_C pin of the display driver 65 via a power supply line 60G. As a result, the second DC/DC converter 64 can supply the second high-voltage system voltage to the display driver 65.

A varistor VR5 is connected to the power supply line 60G. Specifically, one end of the varistor VR5 is connected to a node N61 provided on the power supply line 60G, while the other end is connected to the ground line 60N. Therefore, even when static electricity is generated in the display device 16 since the display device 16 exposed to outside of the aerosol inhaler 1 is rubbed against any object and the static electricity flows back toward the second DC/DC converter 64 via the OLED panel 46 and the display driver 65, the static electricity can be released to the ground line 60N via the varistor VR5, and the second DC/DC converter 64 and the like can be protected from the static electricity.

Similarly, a varistor VR6 is also connected to the power supply line 60E. Specifically, one end of the varistor VR6 is connected to a node N43 provided on the power supply line 60E, while the other end is connected to the ground line 60N. Here, the node N43 is provided between the LDO regulator 62 and the switch SW3 on the power supply line 60E. Therefore, even when static electricity is generated in the display device 16 since the display device 16 exposed to outside of the aerosol inhaler 1 is rubbed against any object and the static electricity flows back toward the LDO regulator 62 via the OLED panel 46 and the display driver 65, the static electricity can be released to the ground line 60N via the varistor VR6, and the LDO regulator 62 can be protected from the static electricity.

A capacitor CD12 functioning as a decoupling capacitor is connected to the power supply line 60G. Specifically, one end of the capacitor CD12 is connected to a node N62 provided on the power supply line 60G, while the other end thereof is connected to the ground line 60N. Here, the node N62 is provided closer to the second DC/DC converter 64 as compared with the node N61 on the power supply line 60G. As a result, the second high-voltage system voltage can be stably supplied to the display driver 65. Even if static electricity is generated in the display device 16, the capacitor CD12 can be protected from the static electricity by the varistor VR5. That is, by providing the node N62 which is closer to the second DC/DC converter as compared with the node N61 on the power supply line 60G, the display driver 65 can be protected from overvoltage while stable operation of the display driver 65 can be achieved.

The EN pin of the second DC/DC converter 64 is a pin configured to set on and off of an operation of the second DC/DC converter 64, and is connected to the PC12 pin of the MCU 50 as described above.

As described above, the VDD pin of the display driver 65 is the positive electrode side power supply pin of the display driver 65, and is connected to the power supply line 60E. The VSS pin of the display driver 65 is a negative electrode side power supply pin of the display driver 65, and is connected to the ground line 60N. As a result, the low-voltage system voltage output from the LDO regulator 62 is supplied to the display driver 65 via the power supply line 60E. The low-voltage system voltage supplied to the display driver 65 is used as a power source for operating the display driver 65.

The VCC_C pin of the display driver 65 is a pin that receives the second high-voltage system voltage, and is connected to the VOUT pin of the second DC/DC converter 64 via the power supply line 60G as described above. When the display driver 65 receives the second high-voltage system voltage by the VCC_C pin, the received second high-voltage system voltage is supplied to the OLED panel 46 via a power supply line 60H. As a result, the display driver 65 can cause the OLED panel 46 to operate. The display driver 65 and the OLED panel 46 may also be connected by another line (not shown). The OLED panel 46 is an example of a load in the present invention.

The SCL pin of the display driver 65 is a pin that receives the SCL side signal of the I2C communication between the MCU 50 and the display driver 65, and is connected to the PB8 pin of the MCU 50 as described above. The SDA pin of the display driver 65 is a pin that receives the SDA side signal of the I2C communication between the MCU 50 and the display driver 65, and is connected to the PB9 pin of the MCU 50 as described above.

The IXS pin of the display driver 65 is a pin configured to set whether to perform the I2C communication or serial peripheral interface (SPI) communication for communication between the display driver 65 and another IC (MCU 50 in the present embodiment). In the present embodiment, by connecting the IXS pin to the power supply line 60E, a high-level voltage is input to the IXS pin, and the communication between the display driver 65 and the MCU 50 is set to be performed by the I2C communication. The communication between the display driver 65 and the MCU 50 may be performed by the SPI communication upon a low-level voltage is input to the IXS pin.

(MCU)

Next, a configuration of the MCU 50 will be described in detail with reference to FIG. 5.

As shown in FIG. 5, the MCU 50 includes, as functional blocks implemented by a processor executing programs stored in a ROM (not shown), an aerosol generation request detection unit 51, a temperature detection unit 52, a power control unit 53, and a notification control unit 54.

The aerosol generation request detection unit 51 detects an aerosol generation request based on an output result of the intake sensor 15. The intake sensor 15 is configured to output a value of a pressure (internal pressure) change in the power supply unit 10 caused by inhale of the user through the inhale port 32. The intake sensor 15 is, for example, a pressure sensor that outputs an output value (for example, a voltage value or a current value) corresponding to internal pressure that changes in accordance with a flow rate of air inhaled from an inlet (not shown) toward the inhale port 32 (that is, the puff operation of the user). The intake sensor 15 may be constituted by a condenser microphone or the like. The intake sensor 15 may output an analog value, or may output a digital value converted from the analog value. The intake sensor 15 may transmit the output to the aerosol generation request detection unit 51 through using the I2C communication or the SPI communication described above, or the like.

The temperature detection unit 52 detects the temperature of the power supply 12 based on input from the thermistor circuit C2. Specifically, the temperature detection unit 52 applies a voltage to the thermistor circuit C2 by turning on the switch SW2, and detects a temperature of the thermistor TH, that is, the temperature of the power supply 12 based on a voltage value input from the thermistor circuit C2 to the MCU 50 (for example, the PC1 pin) at that time.

The power control unit 53 controls supply of power to each electronic component of the aerosol inhaler 1. For example, when the aerosol generation request detection unit 51 detects an aerosol generation request, the power control unit 53 operates the first DC/DC converter 63 and controls switching of the switch SW4, thereby supplying power of the power supply 12 to the load 21 via the positive electrode side discharge terminal 41*a*. As a result, the MCU 50 can supply power to the load 21, heat the load 21, and generate aerosol.

The power control unit 53 turns on the switch SW3 at predetermined timing so as to supply the standard system voltage to the vibrator 47 via the positive electrode side terminal 47*a*. As a result, the MCU 50 can supply power of the standard system voltage to the vibrator 47 and cause the vibrator 47 to vibrate (function).

The power control unit 53 operates the second DC/DC converter 64 at predetermined timing, thereby supplying the second high-voltage system voltage to the OLED panel 46 via the display driver 65. As a result, the MCU 50 can supply power of the second high-voltage system voltage to the OLED panel 46 and cause the OLED panel 46 to operate (function).

When power supply to the load 21 and power supply to the OLED panel 46 are simultaneously performed, discharge from the power supply 12 at that time may be a large current. The discharge of the large current may impose a large burden on the power supply 12, and thus lead to deterioration of the power supply 12. Therefore, it is desirable that the MCU 50 stops the operation (that is, the function) of the OLED panel 46 while the power is supplied to the load 21, that is, while the first DC/DC converter 63 and the switch SW4 are operated.

Specifically, when input to the EN pin of the first DC/DC converter 63 is at a high level, the MCU 50 sets input to the EN pin of the second DC/DC converter 64 to a low level. As a result, when the first DC/DC converter 63 and the switch SW4 are operated, an operation of the second DC/DC converter 64 is stopped, so that the power supply to the OLED panel 46 can be stopped and thus the operation (that is, the function) of the OLED panel 46 can be stopped.

In this way, by preventing the power supply to the load 21 and the power supply to the OLED panel 46 from being performed at the same time, the large current discharge from the power supply 12 can be prevented, and thus the deterioration of the power supply 12 caused by the large current discharge can be prevented.

While the power is supplied to the load 21, that is, while the first DC/DC converter 63 and the switch SW4 are operated, the power supplied to the first DC/DC converter 63 can be prevented from becoming unstable (for example, becoming insufficient) by stopping the power supply to the OLED panel 46. As a result, the power supplied to the load 21 can be stabilized, and thus a decrease in fragrance in the aerosol inhaler 1 caused by a variation in an amount of the aerosol generated by the load 21 due to unstable power supply to the load 21 can be prevented.

When the aerosol generation request detection unit 51 detects an aerosol generation request, the power control unit 53 further turns on the switch SW1 to bring the LED circuit C1 into the conductive state, and causes the LED 70 to emit light (function). In this case, a voltage obtained by lowering the standard system voltage from the charging IC 55 by the resistor R8 is supplied to a connector 70*a*. That is, by turning on the switch SW1, the power control unit 53 can supply power of the voltage obtained by lowering the standard system voltage by the resistor R8 to the LED 70 via the connector 70*a*.

For example, the power control unit 53 performs control such that the power supplied to the LED 70 is smaller than power supplied to other electronic components such as the load 21, the OLED panel 46, and the vibrator 47. That is, the power control unit 53 performs control such that the power supplied to the connector 70*a* is smaller than power supplied to the positive electrode side discharge terminal 41*a*, the positive electrode side terminal 47*a*, and the like. As a result, it is possible to supply appropriate power to the LED 70 with a simple configuration, and thus high functionality of the aerosol inhaler 1 can be achieved while an increase in a manufacturing cost of the aerosol inhaler 1 (for example, the power supply unit 10) is prevented.

The notification control unit 54 controls the notification unit 45 to notify various types of information. For example, the notification control unit 54 controls the notification unit 45 to notify replacement timing of the second cartridge 30 in response to detection of the replacement timing of the second cartridge 30. The notification control unit 54 detects and notifies the replacement timing of the second cartridge 30 based on the cumulative number of times of puff operations or cumulative time of energization to the load 21 stored in the memory 19. The notification control unit 54 is not limited to only notify the replacement timing of the second cartridge 30, and may also notify replacement timing of the first cartridge 20, replacement timing of the power supply 12, charging timing of the power supply 12 and the like. In addition to or instead of these, the notification control unit 54 may notify a remaining amount of the first cartridge 20, a remaining amount of the second cartridge 30, a remaining amount of the power supply 12, and the like.

In a state where one brand-new second cartridge 30 is set, when the puff operation is performed a predetermined number of times or when the cumulative time of energization to the load 21 reaches a predetermined value (for example, 120 seconds) due to the puff operation, the notification control unit 54 may determine that the second cartridge 30 has been used up (that is, a remaining amount is zero or empty), and notify the replacement timing of the second cartridge 30.

When it is determined that all the second cartridges 30 included in the above one set have been used up, the notification control unit 54 may determine that one first cartridge 20 included in the one set has been used up (that is, the remaining amount is zero or empty) and notify the replacement timing of the first cartridge 20.

(Difference Between First DC/DC Converter and Second DC/DC Converter)

Next, a difference between the first DC/DC converter 63 and the second DC/DC converter 64 will be described with reference to FIG. 6.

The first DC/DC converter 63 boosts the input standard system voltage (for example, the output voltage of the power supply 12) to the first high-voltage system voltage, and outputs power required by the load 21. The second DC/DC converter 64 boosts the input standard system voltage to the second high-voltage system voltage, and outputs power required by the OLED panel 46.

An output voltage of the first DC/DC converter 63 is 4.0 to 4.5 [V]. An output voltage of the second DC/DC converter 64 is 10 to 15 [V]. Therefore, the output voltage of the first DC/DC converter 63 is lower than the output voltage of the second DC/DC converter 64. The output voltage of the first DC/DC converter 63 and the output voltage of the second DC/DC converter 64 are set in accordance with voltages required by the load 21 and the OLED panel 46, which are output destinations of the first DC/DC converter 63 and the second DC/DC converter 64, respectively.

An output current of the first DC/DC converter 63 is 1 [A] or more. An output current of the second DC/DC converter 64 is 0.01 [A] or less. Therefore, the output current of the first DC/DC converter 63 is larger than the output current of the second DC/DC converter 64. The output current of the first DC/DC converter 63 and the output current of the second DC/DC converter 64 are set in accordance with the power (current) required by the load 21 and the OLED panel 46, which are the output destinations of the first DC/DC converter 63 and the second DC/DC converter 64, respectively.

As described above, the OLED panel 46 has lower power consumption (current consumption) than the load 21. As compared with the first DC/DC converter 63, the second DC/DC converter 64 preferably has a smaller size and a smaller mounting area than efficiency improvement.

A switching frequency of the first DC/DC converter 63 is 1.00 [MHz]. A switching frequency of the second DC/DC converter 64 is higher than 1.00 [MHz]. Therefore, the switching frequency of the first DC/DC converter 63 is lower than the switching frequency of the second DC/DC converter 64. In principle of a switching regulator of a DC/DC converter, a current flowing through an inductor becomes lower as a switching cycle becomes shorter, that is, as a switching frequency becomes higher, so that a size of the inductor can be reduced. In principle of the switching regulator of the DC/DC converter, a ripple of a waveform subjected to voltage conversion due to switching becomes smaller as the switching cycle becomes shorter, that is, as the switching frequency becomes higher, so that a size of a capacitor that smoothens the ripple can be reduced. Since the switching frequency of the second DC/DC converter 64 is higher than that of the first DC/DC converter 63, a size of an inductor of the second DC/DC converter 64 can be reduced. The size of the inductor of the second DC/DC converter 64 is smaller than a size of an inductor of the first DC/DC converter 63.

Meanwhile, in principle of the switching regulator of the DC/DC converter, a loss generated when a state of a switch transitions between on and off becomes smaller as the switching cycle becomes longer, that is, as the switching frequency becomes lower. Therefore, conversion efficiency, which is a ratio of power output from the VOUT to power input to the VIN pin, is improved. Conversion efficiency of the first DC/DC converter 63 is 90 [%] or more. Conversion efficiency of the second DC/DC converter 64 is less than 90 [%]. The conversion efficiency of the first DC/DC converter 63 is higher than the conversion efficiency of the second DC/DC converter 64.

As described above, the first DC/DC converter 63 whose output destination has large power consumption (current consumption) maintains high conversion efficiency by reducing the switching frequency, while the second DC/DC converter 64 whose output destination has small power consumption (current consumption) has higher switching frequency and is reduced in size, so that a size of the power supply unit 10 can be reduced.

When a signal indicating that the puff operation has been detected is input from the intake sensor 15 to the PC5 pin, that is, when the puff operation of the user is detected, the MCU 50 activates the first DC/DC converter 63. When it is detected that the operation unit 18 is operated by the user, the MCU 50 activates the second DC/DC converter 64. As described above, a condition under which the MCU 50 activates the first DC/DC converter 63 is different from a condition under which the MCU 50 activates the second DC/DC converter 64. As a result, the first DC/DC converter 63 and the second DC/DC converter 64 are less likely to simultaneously function, so that an influence of heat and switching noise generated from one of the DC/DC converters among the first DC/DC converter 63 and the second DC/DC converter 64 on the other DC/DC converter can be reduced.

The MCU 50 stops the function of the first DC/DC converter 63 when a signal indicating an end of the puff operation is input from the intake sensor 15 to the PC5 pin, that is, when the end of the puff operation of the user is detected, or when a continuous energization upper limit time has elapses since the activation of the first DC/DC converter 63. The MCU 50 stops the function of the second DC/DC converter 64 when a predetermined time has elapsed since the activation of the second DC/DC converter 64, or when it is detected that the operation unit 18 is operated again by the user within a predetermined time since the activation of the second DC/DC converter 64. As described above, a condition under which the MCU 50 stops the function of the first DC/DC converter 63 is different from a condition under which the MCU 50 stops the function of the second DC/DC converter 64. As a result, the first DC/DC converter 63 and the second DC/DC converter 64 are less likely to simultaneously function, so that the influence of the heat and the switching noise generated from one of the DC/DC converters among the first DC/DC converter 63 and the second DC/DC converter 64 on the other DC/DC converter can be reduced.

The MCU 50 may be configured to perform control such that the first DC/DC converter 63 and the second DC/DC converter 64 do not function at the same time. As a result, the influence of the heat and the switching noise generated from one of the DC/DC converters among the first DC/DC converter 63 and the second DC/DC converter 64 on the other DC/DC converter can be more reliably reduced.

The MCU 50 may be configured to perform control such that the first DC/DC converter 63 and the second DC/DC converter 64 do not function simultaneously with the charging IC 55. As a result, the influence of the heat and the switching noise generated from the first DC/DC converter 63 and the second DC/DC converter 64 on the charging IC 55 can be reduced.

(Circuit Board)

Next, the circuit board 60 on which a plurality of elements are mounted will be described with reference to FIGS. 2 and 7 to 10. It should be noted that FIGS. 7 to 10 only show a main part of a circuit configuration of the circuit board 60.

As shown in FIG. 2, the circuit board 60 has a first surface 71 and a second surface 72 which is located on a side opposite from the first surface 71. The first surface 71 and the second surface 72 are surfaces substantially perpendicular to the left-right direction. The first surface 71 forms a right surface of the circuit board 60, while the second surface 72 forms a left surface of the circuit board 60. The second surface 72 faces the power supply 12, and/or the second surface 72 is arranged closer to the power supply 12 than the first surface 71. In the present embodiment, the second surface 72 faces the power supply 12.

The plurality of elements are mounted on the first surface 71 which forms the right surface of the circuit board 60 and the second surface 72 which forms the left surface of the circuit board 60.

As shown in FIGS. 7 to 10, the circuit board 60 further includes a ground layer 73 and a power supply layer 74. The ground layer 73 and the power supply layer 74 are provided between the first surface 71 and the second surface 72. That is, in the present embodiment, the circuit board 60 is a four-layer multilayer board formed by laminating the first surface 71, the ground layer 73, the power supply layer 74, and the second surface 72. In the present embodiment, the circuit board 60 is formed by laminating the first surface 71, the ground layer 73, the power supply layer 74, and the second surface 72 in this order from the right. The circuit board 60 may also be a multilayer board having five or more layers in which at least one of the first surface 71, the ground layer 73, the power supply layer 74, and the second surface 72 is further multilayered. In the circuit board 60, the first surface 71, the ground layer 73, the power supply layer 74, and the second surface 72 may be divided into two or more groups or may be laminated only in the same group. In this case, it should be noted that although the circuit board 60 is physically divided into two groups, the order in which the first surface 71, the ground layer 73, the power supply layer 74, and the second surface 72 are arranged in the left-right direction is not changed.

The circuit board 60 has a substantially L shape as a whole when viewed in the left-right direction which is substantially perpendicular to the first surface 71 and the second surface 72 on which the plurality of elements are mounted. Specifically, the circuit board 60 includes a connection portion 600 which has a substantially quadrangular shape as viewed in the left-right direction, a first portion 601 which extends forward from a front end surface of the connection portion 600, and a second portion 602 which extends upward from an upper end surface of the connection portion 600. The first surface 71, the ground layer 73, the power supply layer 74, and the second surface 72 have substantially the same shape, and are substantially L-shaped as viewed in the left-right direction. Specifically, the first surface 71 includes a connection portion 710 which has a substantially quadrangular shape as viewed in the left-right direction, a first portion 711 which extends forward from a front end portion of the connection portion 710, and a second portion 712 which extends upward from an upper end surface of the connection portion 710. The second surface 72 includes a connection portion 720 which has a substantially quadrangular shape as viewed in the left-right direction, a first portion 721 which extends forward from a front end portion of the connection portion 720, and a second portion 722 which extends upward from an upper end surface of the connection portion 720. The ground layer 73 includes a connection portion 730 which has a substantially quadrangular shape as viewed in the left-right direction, a first portion 731 which extends forward from a front end portion of the connection portion 730, and a second portion 732 which extends upward from an upper end surface of the connection portion 730. The power supply layer 74 includes a connection portion 740 which has a substantially quadrangular shape as viewed in the left-right direction, a first portion 741 which extends forward from a front end portion of the connection portion 740, and a second portion 742 which extends upward from an upper end surface of the connection portion 740. The connection portion 600 of the circuit board 60 is formed by the connection portions 710, 720, 730, and 740 of the first surface 71, the ground layer 73, the power supply layer 74, and the second surface 72. The first portion 601 of the circuit board 60 is formed by the first portions 711, 721, 731, and 741 of the first surface 71, the ground layer 73, the power supply layer 74, and the second surface 72. The second portion 602 is formed by the second portions 712, 722, 732, and 742 of the first surface 71, the ground layer 73, the power supply layer 74, and the second surface 72.

Figure 7:
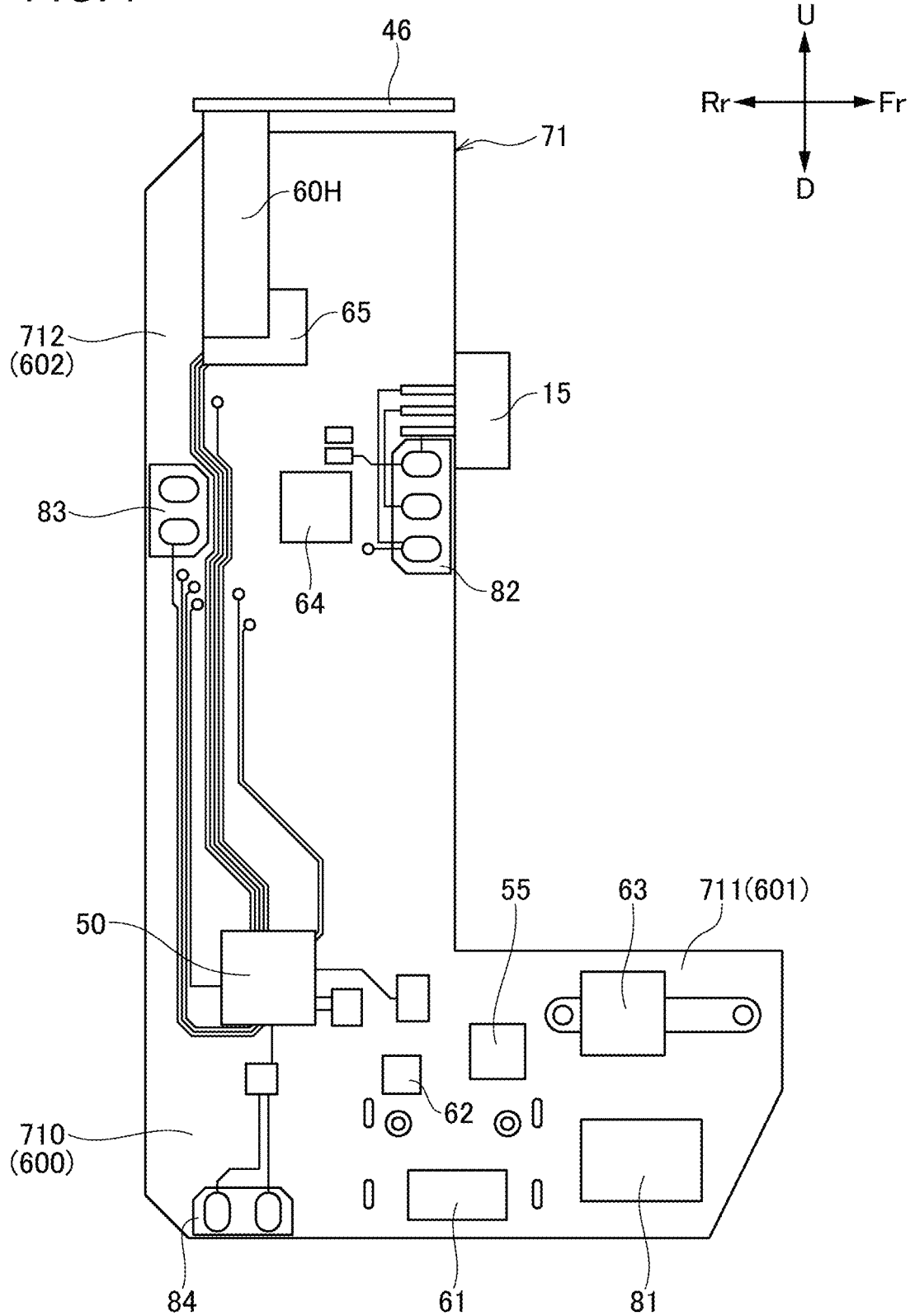
FIG. 7 is a schematic view showing a main part of a circuit configuration of a first surface of a circuit board of the aerosol inhaler shown in FIG. 1 as viewed from a right side.

As shown in FIG. 7, elements of the display driver 65, the second DC/DC converter 64, the MCU 50, the charging IC 55, the LDO regulator 62, the protection IC 61, the first DC/DC converter 63, and a power supply connector 81 are mounted on the first surface 71 of the circuit board 60. Further, an intake sensor connection portion 82, a switch connection portion 83, and a vibrator connection portion 84 are formed on the first surface 71 of the circuit board 60.

The display driver 65 is mounted above an up-down direction center of the second portion 712. The OLED panel 46 is arranged above the circuit board 60. The display driver 65 and the OLED panel 46 are connected by a power supply line 60H.

The second DC/DC converter 64 is mounted slightly above the up-down direction center of the second portion 712 and is located in front of and below the display driver 65.

The MCU 50 is mounted at a position straddling a lower end portion of the second portion 712 and an upper end portion of the connection portion 710.

The charging IC 55 is mounted on a rear end portion of the first portion 711.

As described above, the charging IC 55 is mounted on the first surface 71 located on a side opposite from the second surface 72 which faces the power supply 12 and/or is arranged in the vicinity of the power supply 12. As a result, the power supply 12 can be prevented from being heated by heat generated from the charging IC 55 during charging of the power supply 12.

The LDO regulator 62 is mounted between the MCU 50 and the charging IC 55 in the front-rear direction at a substantially central portion in the up-down direction of the connection portion 710.

As described above, the LDO regulator 62 is mounted on the first surface 71 located on the side opposite from the second surface 72 which faces the power supply 12 and/or is arranged in the vicinity of the power supply 12. As a result, the power supply 12 can be prevented from being heated by heat generated from the LDO regulator 62 during the charging of the power supply 12.

The protection IC 61 is mounted at a position straddling the connection portion 710 and the first portion 711 below the charging IC 55 and the LDO regulator 62.

The first DC/DC converter 63 is mounted on a front upper end portion of the first portion 711.

As described above, since the first DC/DC converter 63 is mounted on the first surface 71 located on the side opposite from the second surface 72 which faces the power supply 12 and/or is arranged in the vicinity of the power supply 12, the power supply 12 can be prevented from being heated by heat generated during functioning of the first DC/DC converter 63.

The power supply connector 81 is a connector configured to electrically connect the circuit board 60 to the power supply 12, and is mounted on a lower end portion of the first portion 711 below the first DC/DC converter 63. A power line connected to the power supply 12 is connected to the power supply connector 81.

The intake sensor connection portion 82 is formed at a substantially central portion in the up-down direction of a front end portion of the second portion 712. A power line connected to the intake sensor 15 is soldered to the intake sensor connection portion 82.

The switch connection portion 83 is formed at a substantially central portion in the up-down direction of a rear end portion of the second portion 712. A power line connected to the operation unit 18 is soldered to the switch connection portion 83.

The vibrator connection portion 84 is formed at a rear lower end portion of the connection portion 710. Power lines connected to the positive electrode side terminal 47a and the negative electrode side terminal 47b of the vibrator 47 are soldered to the vibrator connection portion 84.

Therefore, the first DC/DC converter 63 and the second DC/DC converter 64 are mounted on the circuit board 60 so as to be spaced apart from each other. More specifically, the first DC/DC converter 63 is mounted on the first portion 601 of the circuit board 60, while the second DC/DC converter 64 is mounted on the second portion 602 of the circuit board 60. Further, the first DC/DC converter 63 is mounted on the first portion 601 of the circuit board 60, the second DC/DC converter 64 is mounted on the second portion 602 of the circuit board 60, while the MCU 50 is mounted at the position straddling the lower end portion of the second portion 712 of the circuit board 60 and the upper end portion of the connection portion 710. As a result, a linear distance between the first DC/DC converter 63 and the second DC/DC converter 64 is longer than a linear distance between the first DC/DC converter 63 and the MCU 50, and is also longer than a linear distance between the second DC/DC converter 64 and the MCU 50. The term "linear distance" as used herein refers to a shortest distance between two objects connected by a straight line. The same also applies to the following description.

As described above, since the first DC/DC converter 63 and the second DC/DC converter 64 are mounted on the circuit board 60 so as to be spaced apart from each other, the influence of the heat and the switching noise generated from one of the DC/DC converters among the first DC/DC converter 63 and the second DC/DC converter 64 on the other DC/DC converter can be reduced.

Since the first DC/DC converter 63 and the second DC/DC converter 64 are both mounted on the first surface 71 of the circuit board 60, the first DC/DC converter 63 and the second DC/DC converter 64 are arranged on the same surface, so that the second surface 72 on which the first DC/DC converter 63 and the second DC/DC converter 64 are not mounted is less likely to be influenced by the heat and the switching noise generated from the DC/DC converters.

Figure 10:
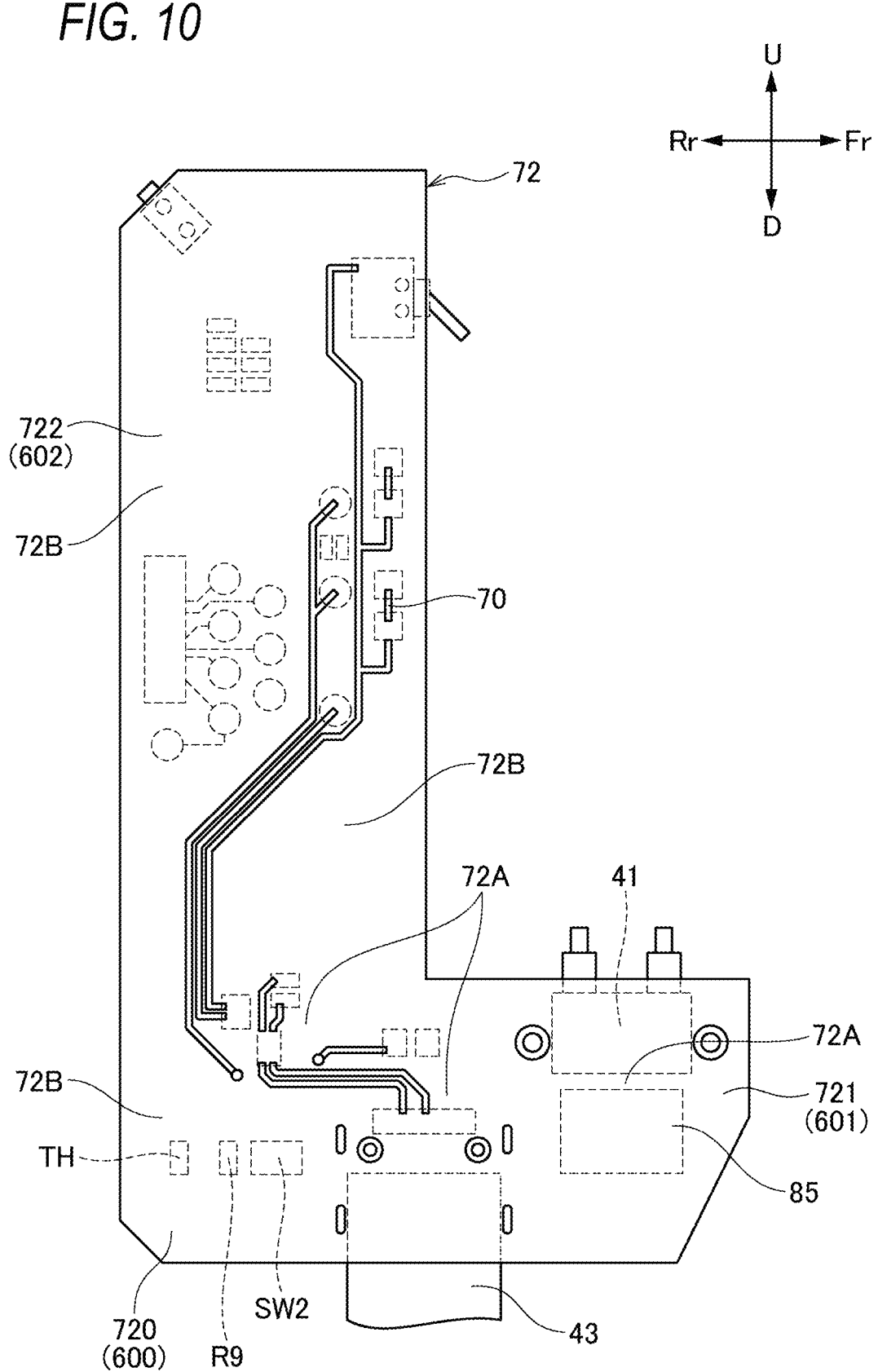
FIG. 10 is a schematic view showing a main part of a circuit configuration of a second surface of the circuit board of the aerosol inhaler shown in FIG. 1 as viewed from the right side.

As shown in FIG. 10, the LED 70, the discharge terminal 41, a power module 85, the charge terminal 43, and the thermistor TH are mounted on the second surface 72 of the circuit board 60.

The LED 70 is mounted on a substantially central portion in the up-down direction of a rear end portion of the second portion 722.

The discharge terminal 41 is mounted so as to protrude upward from an upper end portion of the first portion 721. The discharge terminal 41 is a pin which is incorporated with a spring, and is connected to the load 21 of the first cartridge 20. Power of the power supply 12 is supplied from the discharge terminal 41 to the load 21.

The power module 85 is mounted on the first portion 721 below the discharge terminal 41. The power module 85 includes the switch SW4, the capacitor CD10, and the varistor VR4. It should be noted that the power module 85 only needs to include the switch SW4, and may not include the capacitor CD10 and/or the varistor VR4. In this case, the capacitor CD10 and/or the varistor VR4 which are not included in the power module 85 are provided between the discharge terminal 41 and the power module 85.

The charge terminal 43 is mounted so as to protrude downward from a lower end portion of the second surface 72 at a position straddling the connection portion 720 and the first portion 721 in the front-rear direction.

Further, on the first surface 71 which is located on the side opposite from the second surface 72 as viewed in the left-right direction, at least a portion of the protection IC 61 is mounted in a region overlapping the charge terminal 43 mounted on the second surface 72 (see FIG. 7).

As a result, the elements can be mounted on the circuit board 60 at high density, and the circuit board 60 can be further downsized.

The thermistor TH is mounted in a region behind and below the connection portion 720. Therefore, the thermistor TH is mounted on a rear lower end portion of the entire second surface 72.

Since the thermistor TH is mounted on the second surface 72 which faces the power supply 12 and/or is arranged closer to the power supply 12 than the first surface 71, the thermistor TH can be arranged to face the power supply 12 and/or arranged closer to the power supply 12. As a result, the temperature of the power supply 12 can be detected more accurately by the thermistor TH.

The thermistor circuit C2 is formed on the second surface 72 by the thermistor TH and the resistor R9. The resistor R9 is mounted on the second surface 72 in front of the thermistor TH. The thermistor TH is arranged apart from the resistor R9. At least one of the plurality of elements is mounted at a position where a linear distance from the resistor R9 to the at least one of the plurality of elements is shorter than a linear distance from the resistor R9 to the thermistor TH. In the present embodiment, the switch SW2 is mounted at a position where a linear distance from the resistor R9 to the switch SW2 is shorter than a linear distance from the resistor R9 to the thermistor TH.

In this way, since the thermistor TH is mounted on the second surface 72 so as to be spaced apart from the resistor R9, the thermistor TH is less likely to be influenced by heat generated from the resistor R9. As a result, the temperature of the power supply 12 can be detected more accurately by the thermistor TH.

Since the thermistor TH is mounted on the second surface 72 which is different from the first surface 71 on which the MCU 50 is mounted, the thermistor TH is less likely to be influenced by heat generated from the MCU 50. As a result, the temperature of the power supply 12 can be detected more accurately by the thermistor TH.

Since the first DC/DC converter 63 is mounted on the first surface 71 which is different from the second surface 72 on which the thermistor TH is mounted, the thermistor TH is less likely to be influenced by heat generated from the first DC/DC converter 63. As a result, the temperature of the power supply 12 can be detected more accurately by the thermistor TH.

Since the LDO regulator 62 is mounted on the first surface 71 which is different from the second surface 72 on which the thermistor TH is mounted, the thermistor TH is less likely to be influenced by heat generated from the LDO regulator 62. As a result, the temperature of the power supply 12 can be detected more accurately by the thermistor TH.

Since the charging IC 55 is mounted on the first surface 71 which is different from the second surface 72 on which the thermistor TH is mounted, the thermistor TH is less likely to be influenced by heat generated from the charging IC 55. As a result, the temperature of the power supply 12 can be detected more accurately by the thermistor TH.

Both the first DC/DC converter 63 and the discharge terminal 41 which is connected to the load 21 functioning by consuming power output from the first DC/DC converter 63 are mounted on the first portion 601 of the circuit board 60. Further, the second DC/DC converter 64 and the display driver 65 which is connected to the OLED panel 46 functioning by consuming power output from the second DC/DC converter 64 are mounted on the second portion 602 of the circuit board 60.

The discharge terminal 41 is not necessarily mounted on the first portion 601 of the circuit board 60, and may also be connected to the second portion 602 of the circuit board 60. Similarly, the display driver 65 is not necessarily mounted on the second portion 602 of the circuit board 60, and may also be connected to the first portion 601 of the circuit board 60.

As described above, since the discharge terminal 41 is mounted on or connected to the first portion 601 of the circuit board 60 while the display driver 65 is mounted on or connected to the second portion 602 of the circuit board 60, the discharge terminal 41 can be arranged close to the first DC/DC converter 63 while the display driver 65 can be arranged close to the second DC/DC converter 64. Therefore, a path for supplying the power boosted by the first DC/DC converter 63 to the load 21 can be shortened, while a path for supplying the power boosted by the second DC/DC converter 64 to the OLED panel 46 can be shortened. As a result, a loss of the power boosted by the first DC/DC converter 63 and the second DC/DC converter 64 can be reduced. An influence on other elements caused by the loss of the power boosted by the first DC/DC converter 63 and the second DC/DC converter 64 can thus be reduced, and a decrease in an amount of aerosol that can be generated with a single time of charging can be reduced.

The first DC/DC converter 63 is mounted on the first surface 71, while the power module 85 is mounted on the second surface 72. As described above, since the first DC/DC converter 63 and the power module 85 are mounted on different surfaces of the circuit board 60, heat generated from the first DC/DC converter 63 and heat generated from the power module 85 when power is supplied to the load 21 can be prevented from being concentrated.

Since the power module 85 and the discharge terminal 41 are both mounted on the first portion 721 of the second surface 72, the power module 85 and the discharge terminal 41 are mounted close to each other. As a result, a length of a portion of the power supply line 60F that electrically connects the power module 85 and the discharge terminal 41 can be reduced. A pulse wave flows through the portion of the power supply line 60F that electrically connects the power module 85 and the discharge terminal 41. Therefore, by shortening the length of the portion of the power supply line 60F that electrically connects the power module 85 and the discharge terminal 41, an influence of the pulse wave on other elements can be reduced.

On the first surface 71 which is located on the side opposite from the second surface 72, no element is mounted in a region overlapping the thermistor TH mounted on the second surface 72 as viewed in the left-right direction.

Therefore, the thermistor TH is less likely to be influenced by heat generated from each element mounted on the first surface 71 located on the side opposite from the second surface 72. As a result, the temperature of the power supply 12 can be detected more accurately by the thermistor TH.

The second surface 72 has a high density region 72A in which a large number of elements are mounted and mounting density of the mounted elements is high, and a low density region 72B in which the mounting density of the mounted elements is lower than that of the high density region 72A. In the present embodiment, the first portion 721, an upper region of the connection portion 720, and a region near an up-down direction center of the connection portion 720 between the connection portion 720 and the first portion 721 constitute the high-density region 72A. In the present embodiment, the thermistor TH is mounted in a rear and lower region of the connection portion 720 which is a part of the low density region 72B in which the mounting density of the mounted elements is lower than that of the high-density region 72A. In the present embodiment, in addition to the rear lower region of the connection portion 720, a lower region of the second portion 722 and a rear upper region of the second portion 722 constitute the low density region 72B.

Therefore, since the thermistor TH is mounted in the region where the mounting density of the mounted elements is low, the thermistor TH is less likely to be influenced by heat generated from other elements mounted on the circuit board 60. As a result, the temperature of the power supply 12 can be detected more accurately by the thermistor TH.

Figure 8:
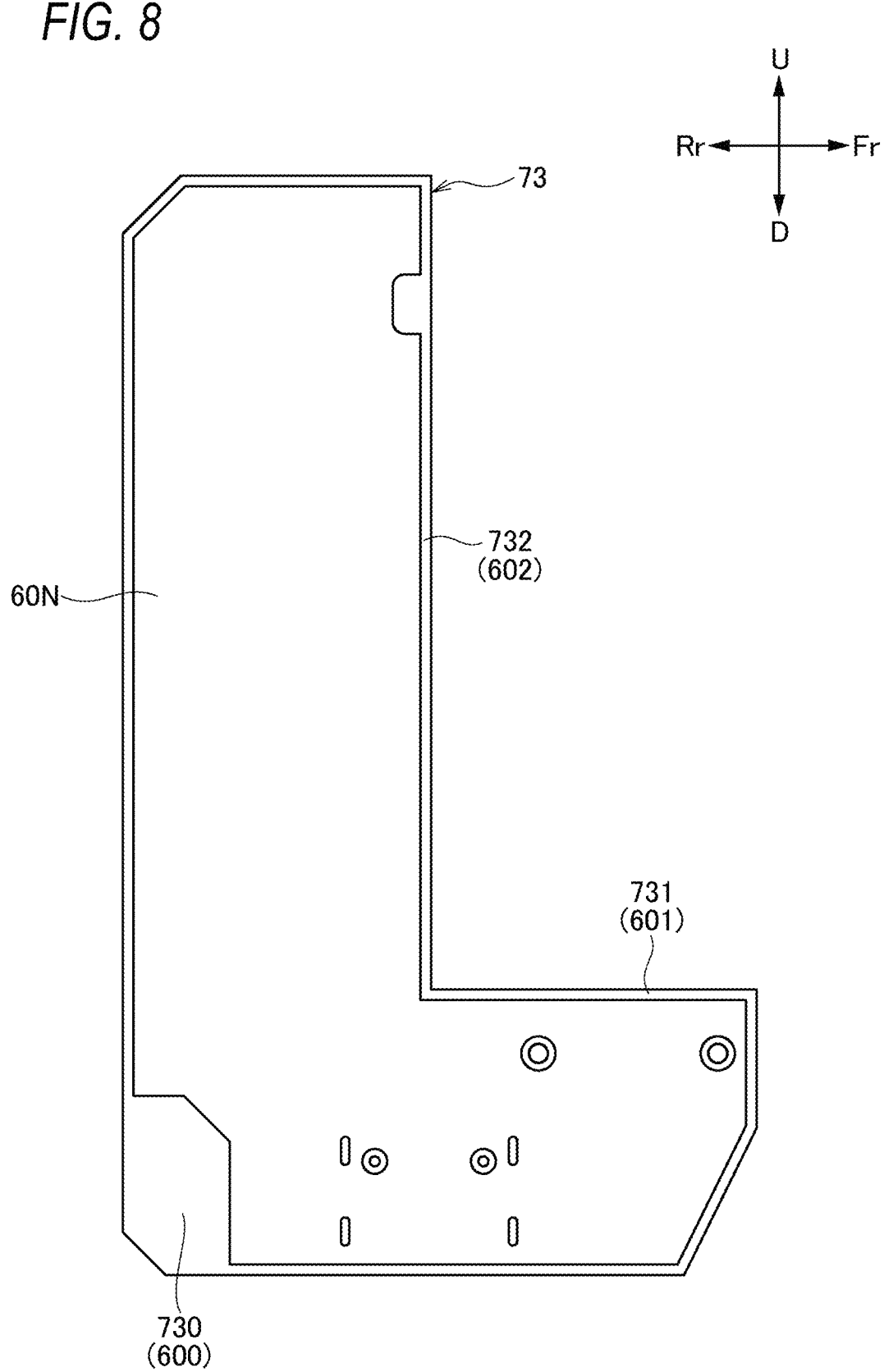
FIG. 8 is a schematic view showing a main part of a circuit configuration of a ground layer of the circuit board of the aerosol inhaler shown in FIG. 1 as viewed from the right side.

As shown in FIG. 8, the ground line 60N is formed in the ground layer 73 of the circuit board 60. In the present embodiment, the ground line 60N is a conductive thin film formed on the ground layer 73 of the circuit board 60, and has a reference potential of the circuit board 60.

The ground line 60N is not formed in a region overlapping the thermistor TH mounted on the second surface 72 as viewed in the left-right direction. Therefore, the thermistor TH is less likely to be influenced by heat generated from the ground line 60N. As a result, the temperature of the power supply 12 can be detected more accurately by the thermistor TH.

The ground line 60N is not formed in a rear lower end region of the ground layer 73 which includes a region overlapping the thermistor TH mounted on the second surface 72 as viewed in the left-right direction. In other words, the ground line 60N has a shape obtained by cutting out the rear lower end region of the ground layer 73 as viewed in the left-right direction. Therefore, the ground line 60N is not formed in the region overlapping the thermistor TH as viewed in the left-right direction, and does not surround the thermistor TH. Therefore, the thermistor TH is less likely to be influenced by heat generated from the ground line 60N. As a result, the temperature of the power supply 12 can be detected more accurately by the thermistor TH.

Figure 9:
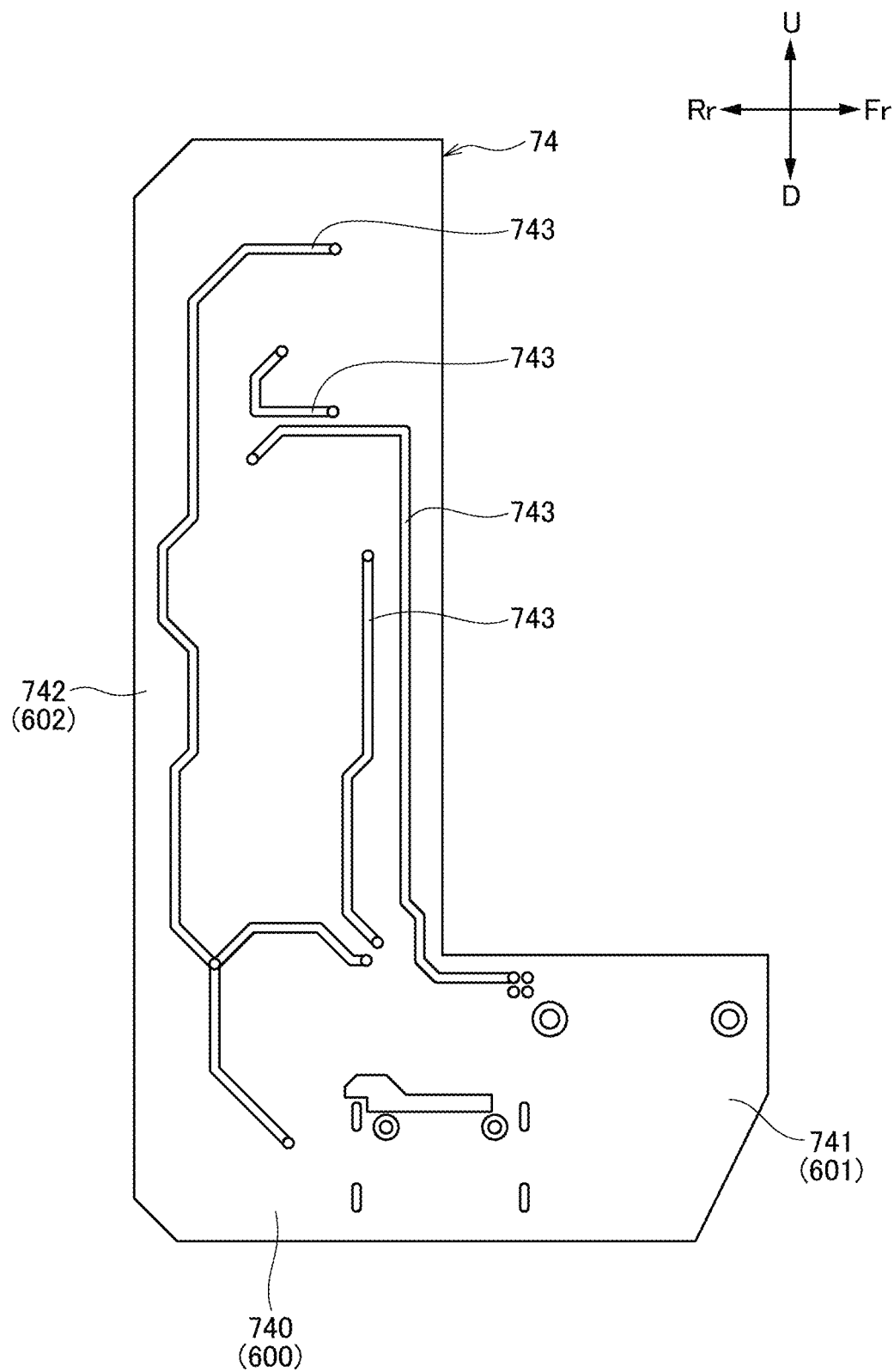
FIG. 9 is a schematic view showing a main part of a circuit configuration of a power supply layer of the circuit board of the aerosol inhaler shown in FIG. 1 as viewed from the right side.

As shown in FIG. 9, a power supply path 743 that supplies power to each element mounted on the circuit board 60 is formed in the power supply layer 74 of the circuit board 60. The power supply path 743 includes the power supply lines 60A, 60B, 60C, 60D, 60E, 60G, and the like. The power supply path 743 is a conductor circuit wiring formed in the power supply layer 74 of the circuit board 60 by printing or the like.

The power supply path 743 is not formed in the region overlapping the thermistor TH mounted on the second surface 72 as viewed in the left-right direction. Therefore, the thermistor TH is less likely to be influenced by heat generated from the power supply path 743. As a result, the temperature of the power supply 12 can be detected more accurately by the thermistor TH.

The power supply path 743 is not formed in a rear lower end region of the power supply layer 74 which includes a region overlapping the thermistor TH mounted on the second surface 72 as viewed in the left-right direction. Further, the power supply path 743 is formed so as not to surround the thermistor TH as viewed in the left-right direction. Therefore, the thermistor TH is less likely to be influenced by the heat generated from the power supply path 743. As a result, the temperature of the power supply 12 can be detected more accurately by the thermistor TH.

As described above, the ground line 60N of the ground layer 73 and the power supply path 743 of the power supply layer 74 are not formed in the region overlapping the thermistor TH mounted on the second surface 72 as viewed in the left-right direction. Therefore, the thermistor TH is less likely to be influenced by the heat generated from the ground line 60N and the power supply path 743. As a result, the temperature of the power supply 12 can be detected more accurately by the thermistor TH.

Referring back to FIG. 2, the internal holder 13 holds the circuit board 60 on a right side of the partition wall 13d and holds the power supply 12 on a left side of the partition wall 13d. As described above, since the circuit board 60 and the power supply 12 are both held by the internal holder 13, the thermistor TH can be maintained at a position suitable for detecting the temperature of the power supply 12.

It should be noted that the internal holder 13 may hold only a part of the circuit board 60 on the right side of the partition wall 13d and hold only a part of the power supply 12 on the left side of the partition wall 13d. More specifically, the internal holder 13 may hold the circuit board 60 and the power supply 12 such that positions of the thermistor TH and the power supply 12 facing the thermistor TH in the left-right direction are exposed from the internal holder 13. In this case, since the temperature of the power supply 12 is transmitted to the thermistor TH without passing through the partition wall 13d, the thermistor TH can detect the temperature of the power supply 12 more accurately at high speed.

Although the embodiment of the present invention is described above, the present invention is not limited to the above-described embodiment, and modifications, improvements, and the like can be made as appropriate.

For example, although the first DC/DC converter 63 and the second DC/DC converter 64 are both mounted on the first surface 71 of the circuit board 60 in the present embodiment, a configuration in which the first DC/DC converter 63 is mounted on the first surface 71 of the circuit board 60 while the second DC/DC converter 64 is mounted on the second surface 72 of the circuit board 60 may also be employed. In this case, the first DC/DC converter 63 and the second DC/DC converter 64 are mounted on different surfaces, and can thus be arranged apart from each other, so that the influence of the heat and the switching noise generated from one of the DC/DC converters among the first DC/DC converter 63 and the second DC/DC converter 64 on the other DC/DC converter can be reduced.

For example, although the ground layer 73 has substantially the same shape as the first surface 71 and the second surface 72 as viewed in the left-right direction in the present embodiment, the ground layer 73 may have a shape whose rear lower end region is cut out as compared with the first surface 71 and the second surface 72. In this case, the thermistor TH is less likely to be influenced by heat generated from the ground line 60N. As a result, the temperature of the power supply 12 can be detected more accurately by the thermistor TH.

For example, although the power supply layer 74 has substantially the same shape as the first surface 71 and the second surface 72 as viewed in the left-right direction in the present embodiment, the power supply layer 74 may have a shape whose rear lower end region is cut out as compared with the first surface 71 and the second surface 72. In this case, the thermistor TH is less likely to be influenced by the heat generated from the power supply path 743. As a result, the temperature of the power supply 12 can be detected more accurately by the thermistor TH.

For example, although the temperature of the power supply 12 is acquired by the thermistor TH in the present embodiment, the temperature of the power supply 12 may be acquired by any temperature sensor as desired without being limited to the thermistor TH.

For example, although the circuit board 60 is configured by the connection portion 600, the first portion 601, and the second portion 602, and the entire circuit board 60 substantially has an L shape in the present embodiment, a configuration in which a part of the circuit board 60 has the substantially L shape formed by the connection portion 600, the first portion 601, and the second portion 602 may also be employed.

For example, although the circuit board 60 and the power supply 12 are arranged inside the power supply unit case 11 so as to overlap each other in the left-right direction in the present embodiment, the second surface 72 may be arranged closer to the power supply than the first surface 71. Therefore, the circuit board 60 and the power supply 12 may be offset so as not to overlap with each other in the left-right direction and arranged inside the power source unit case 11.

In the present specification, at least the following matters are described. Although corresponding constituent elements or the like in the above embodiments are shown in parentheses, the present invention is not limited thereto.

(1) A power supply unit (power supply unit 10) for an aerosol inhaler (aerosol inhaler 1) includes: a power supply (power supply 12) configured to supply power to a load (load 21) that atomizes an aerosol source (aerosol source 22);

a first DC/DC converter (first DC/DC converter 63) connected to the power supply;

a second DC/DC converter (second DC/DC converter 64) connected to the power supply and different from the first DC/DC converter; and a circuit board (circuit board 60) on which the first DC/DC converter and the second DC/DC converter are mounted.

As viewed from a first direction (left-right direction) perpendicular to a surface of the circuit board on which the first DC/DC converter and the second DC/DC converter are mounted, at least a portion of the circuit board includes: a connection portion (connection portion 600); a first portion (first portion 601) extending from the connection portion in a second direction (front-rear direction) perpendicular to the first direction; and a second portion (second portion 602) extending from the connection portion in a third direction (up-down direction) perpendicular to the first direction and the second direction.

The first DC/DC converter is mounted on the first portion.

The second DC/DC converter is mounted on the second portion.

According to (1), since the first DC/DC converter is mounted on the first portion of the circuit board while the second DC/DC converter is mounted on the second portion of the circuit board, the first DC/DC converter and the second DC/DC converter are mounted on the circuit board so as to be spaced apart from each other. As a result, the circuit board of the aerosol inhaler power supply unit is mounted with the first DC/DC converter and the second DC/DC converter while an influence of heat and switching noise generated from one DC/DC converter on the other DC/DC converter can be reduced.

(2) The power supply unit for the aerosol inhaler according to (1), in which the circuit board is mounted with or connected with a first connector (discharge terminal 41) connected to a first load (load 21) which functions by consuming power output from the first DC/DC converter, and a second connector (display driver 65) connected to a second load (OLED panel 46) which functions by consuming power output from the second DC/DC converter.

The first connector is mounted on or connected to the first portion.

The second connector is mounted on or connected to the second portion.

According to (2), the first connector is mounted on or connected to the first portion while the second connector is mounted on or connected to the second portion, so that the first connector can be arranged close to the first DC/DC converter, and the second connector can be arranged close to the second DC/DC converter 64. Therefore, a path for supplying power boosted by the first DC/DC converter to the first load can be shortened, while a path for supplying power boosted by the second DC/DC converter to the second load can be shortened. As a result, a loss of the power boosted by the first DC/DC converter and the second DC/DC converter can be reduced. An influence on other elements caused by the loss of the power boosted by the first DC/DC converter and the second DC/DC converter can thus be reduced, and a decrease in an amount of aerosol that can be generated with a single time of charging can be reduced.

(3) A power supply unit (power supply unit 10) for an aerosol inhaler (aerosol inhaler 1) includes: a power supply (power supply 12) configured to supply power to a load (load 21) that atomizes an aerosol source (aerosol source 22);

a first DC/DC converter (first DC/DC converter 63) connected to the power supply;

a second DC/DC converter (second DC/DC converter 64) connected to the power supply and different from the first DC/DC converter; and a circuit board (circuit board 60) on which the first DC/DC converter and the second DC/DC converter are mounted.

The first DC/DC converter and the second DC/DC converter are mounted on the circuit board so as to be spaced apart from each other.

According to (3), since the first DC/DC converter and the second DC/DC converter are mounted on the circuit board so as to be spaced apart from each other, the circuit board of the aerosol inhaler power supply unit is mounted with the first DC/DC converter and the second DC/DC converter while an influence of heat and switching noise generated from one DC/DC converter on the other DC/DC converter can be reduced.

(4) A power supply unit (power supply unit 10) for an aerosol inhaler (aerosol inhaler 1) includes: a power supply (power supply 12) configured to supply power to a load (load 21) that atomizes an aerosol source (aerosol source 22);

a first DC/DC converter (first DC/DC converter 63) connected to the power supply;

a second DC/DC converter (second DC/DC converter 64) connected to the power supply and different from the first DC/DC converter; and a circuit board (circuit board 60) on which the first DC/DC converter, the second DC/DC converter and an element (MCU 50) are mounted.

The first DC/DC converter and the second DC/DC converter are mounted on the circuit board such that a linear distance between the first DC/DC converter and the second DC/DC converter is longer than a linear distance between the first DC/DC converter and the element and longer than a linear distance between the second DC/DC converter and the element.

According to (4), since the first DC/DC converter and the second DC/DC converter are mounted on the circuit board such that the linear distance between the first DC/DC converter and the second DC/DC converter is longer than the linear distance between the first DC/DC converter and the element and longer than the linear distance between the second DC/DC converter and the element, the first DC/DC converter and the second DC/DC converter are mounted on the circuit board so as to be spaced apart from each other. As a result, the circuit board of the aerosol inhaler power supply unit is mounted with the first DC/DC converter and the second DC/DC converter while an influence of heat and switching noise generated from one DC/DC converter on the other DC/DC converter can be reduced.

(5) The power supply unit for the aerosol inhaler according to any one of (1) to (4), in which an output current of the first DC/DC converter is larger than an output current of the second DC/DC converter.

A switching frequency of the first DC/DC converter is lower than a switching frequency of the second DC/DC converter.

A size of an inductor of the first DC/DC converter is larger than a size of an inductor of the second DC/DC converter.

According to (5), the second DC/DC converter, whose output destination has small current consumption as compared with the first DC/DC converter, has higher switching frequency and is reduced in size, so that a size of the power supply unit can be reduced while a decrease in power efficiency of the power supply unit can be prevented.

(6) The power supply unit for the aerosol inhaler according to any one of (1) to (4), in which an output current of the first DC/DC converter is larger than an output current of the second DC/DC converter.

Conversion efficiency of the first DC/DC converter is higher than conversion efficiency of the second DC/DC converter.

According to (6), the conversion efficiency of the first DC/DC converter, whose output destination has large current consumption as compared with the second DC/DC converter, can be maintained at a high level, so that the decrease in the power efficiency of the power supply unit can be prevented.

(7) The power supply unit for the aerosol inhaler according to any one of (1) to (6), in which the circuit board includes a first surface (first surface 71) and a second surface (second surface 72) which is a reverse surface from the first surface or is located on a side opposite from the first surface.

The first DC/DC converter and the second DC/DC converter are mounted on the first surface.

According to (7), since the first DC/DC converter and the second DC/DC converter are both mounted on the first surface of the circuit board, the first DC/DC converter and the second DC/DC converter are arranged on the same surface, so that the second surface on which the first DC/DC converter and the second DC/DC converter are not mounted can be less likely to be influenced by the heat and the switching noise generated from the DC/DC converters.

(8) The power supply unit for the aerosol inhaler according to any one of (1) to (6), in which the circuit board includes a first surface (first surface 71) and a second surface (second surface 72) which is a reverse surface from the first surface or is located on a side opposite from the first surface.

The first DC/DC converter is mounted on the first surface.

The second DC/DC converter is mounted on the second surface.

According to (8), the first DC/DC converter and the second DC/DC converter are mounted on different surfaces. As a result, the first DC/DC converter and the second DC/DC converter are arranged apart from each other, so that the influence of the heat and the switching noise generated from one of the DC/DC converters among the first DC/DC converter and the second DC/DC converter on the other DC/DC converter can be reduced.

(9) The power supply unit for the aerosol inhaler according to any one of (1) to (8) further includes a controller (MCU 50) configured to control the first DC/DC converter and the second DC/DC converter.

A condition under which the controller activates the first DC/DC converter is different from a condition under which the controller activates the second DC/DC converter.

According to (9), since the condition under which the controller activates the first DC/DC converter is different from the condition under which the controller activates the second DC/DC converter, the first DC/DC converter and the second DC/DC converter are less likely to function simultaneously. As a result, the influence of the heat and the switching noise generated from one of the DC/DC converters among the first DC/DC converter and the second DC/DC converter on the other DC/DC converter can be reduced.

(10) The power supply unit for the aerosol inhaler according to any one of (1) to (9) further includes a controller (MCU 50) configured to control the first DC/DC converter and the second DC/DC converter.

A condition under which the controller stops the first DC/DC converter is different from a condition under which the controller stops the second DC/DC converter.

According to (10), since the condition under which the controller stops functioning of the first DC/DC converter is different from the condition under which the controller stops functioning of the second DC/DC converter, the first DC/DC converter and the second DC/DC converter are less likely to function simultaneously. As a result, the influence of the heat and the switching noise generated from one of the DC/DC converters among the first DC/DC converter and the second DC/DC converter on the other DC/DC converter can be reduced.

(11) The power supply unit for the aerosol inhaler according to any one of (1) to (8) further includes a controller (MCU 50) configured to control the first DC/DC converter and the second DC/DC converter.

The controller is configured to perform control such that the first DC/DC converter and the second DC/DC converter do not function simultaneously.

According to (11), since the controller is configured to perform control such that the first DC/DC converter and the second DC/DC converter do not function simultaneously, the influence of the heat and the switching noise generated from one of the DC/DC converters among the first DC/DC converter and the second DC/DC converter on the other DC/DC converter can be more reliably reduced.

(12) The power supply unit for the aerosol inhaler according to any one of (1) to (11) further includes:

a charger (charging IC 55) configured to control charging of the power supply; and a controller (MCU 50) configured to control the first DC/DC converter, the second DC/DC converter, and the charger.

The controller is configured to perform control such that the first DC/DC converter and the second DC/DC converter do not function simultaneously with the charger.

According to (12), since the controller is configured to perform control such that the first DC/DC converter and the second DC/DC converter do not function simultaneously with the charger, the influence of the heat and the switching noise generated from the first DC/DC converter and the second DC/DC converter on the charger can be reduced.

What is claimed is:

1. A power supply unit for an aerosol inhaler comprising:
a power supply configured to supply power to a load that atomizes an aerosol source;
a first DC/DC converter connected to the power supply;
a second DC/DC converter connected to the power supply and different from the first DC/DC converter; and
a circuit board on which the first DC/DC converter and the second DC/DC converter are mounted, wherein
as viewed from a first direction perpendicular to a surface of the circuit board on which the first DC/DC converter and the second DC/DC converter are mounted, at least a portion of the circuit board includes: a connection portion, a first portion of the connection portion extending in a second direction perpendicular to the first direction, and a second portion of the connection portion extending in a third direction perpendicular to the first direction and the second direction,
the first DC/DC converter is mounted on the first portion, and the second DC/DC converter is mounted on the second portion, wherein the power supply unit further comprises a controller configured to control the first DC/DC converter and the second DC/DC converter, and wherein the controller is configured to perform control such that the first DC/DC converter and the second DC/DC converter do not function simultaneously.

2. The power supply unit according to claim 1, wherein the circuit board is mounted with or connected with a first connector connected to a first load which functions by consuming power output from the first DC/DC converter, and a second connector connected to a second load which functions by consuming power output from the second DC/DC converter, the first connector is mounted on or connected to the first portion, and the second connector is mounted on or connected to the second portion.

3. The power supply unit according to claim 1, wherein an output current of the first DC/DC converter is larger than an output current of the second DC/DC converter, a switching frequency of the first DC/DC converter is lower than a switching frequency of the second DC/DC converter, and a size of an inductor of the first DC/DC converter is larger than a size of an inductor of the second DC/DC converter.

4. The power supply unit according to claim 1, wherein an output current of the first DC/DC converter is larger than an output current of the second DC/DC converter, and conversion efficiency of the first DC/DC converter is higher than conversion efficiency of the second DC/DC converter.

5. The power supply unit according to claim 1, wherein the circuit board includes a first surface and a second surface which is a reverse surface from the first surface or is located on a side opposite from the first surface, and the first DC/DC converter and the second DC/DC converter are mounted on the first surface.

6. The power supply unit according to claim 1, wherein the circuit board includes a first surface and a second surface which is a reverse surface from the first surface or is located on a side opposite from the first surface, the first DC/DC converter is mounted on the first surface, and the second DC/DC converter is mounted on the second surface.

7. The power supply unit according to claim 1 further comprising:

a controller configured to control the first DCI DC converter and the second DC/DC converter, wherein a condition under which the controller activates the first DC/DC converter is different from a condition under which the controller activates the second DC/DC converter.

8. The power supply unit according to claim 1, further comprising:

a controller configured to control the first DC/DC converter and the second DC/DC converter, wherein a condition under which the controller stops the first DC/DC converter is different from a condition under which the controller stops the second DC/DC converter.

9. The power supply unit according to claim 1, further comprising:

a charger configured to control charging of the power supply, wherein the controller is configured to control the first DC/DC converter, the second DC/DC converter, and the charger, wherein the controller is configured to perform control such that the first DC/DC converter and the second DC/DC converter do not function simultaneously with the charger.

10. The power supply unit according to claim 1, wherein the circuit board is substantially L-shaped.

11. The power supply unit according to claim 1, further comprising:

a regulator configured to supply power for the controller, wherein the first DC/DC converter and the second DC/DC converter are controlled by the controller being supplied the power from the regulator such that the first DC/DC converter and the second DC/DC converter do not function simultaneously.

12. The power supply unit according to claim 2, wherein one of the first load and the second load is the load that atomizes an aerosol source, and another of the first load and the second load is an electric component except for the controller and the load.

13. The power supply unit according to claim 1, wherein the controller is electrically connected to the first DC/DC converter and the second DC/DC converter and configured to output signals toward the first DC/DC converter and the second DC/DC converter.

* * * * *